US010372060B2

(12) United States Patent
Iida et al.

(10) Patent No.: US 10,372,060 B2
(45) Date of Patent: Aug. 6, 2019

(54) IMAGE FORMING APPARATUS FOR SCANNING LIGHT BEAM AT NON-UNIFORM SCAN SPEED AND EXPOSING PHOTOSENSITIVE MEMBER

(71) Applicant: CANON KABUSHIKI KAISHA, Tokyo (JP)

(72) Inventors: Kenichi Iida, Tokyo (JP); Yusuke Shimizu, Yokohama (JP); Jun Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/974,487

(22) Filed: May 8, 2018

(65) Prior Publication Data

US 2018/0329335 A1 Nov. 15, 2018

(30) Foreign Application Priority Data

May 15, 2017 (JP) .................. 2017-096542

(51) Int. Cl.
  *G03G 15/04* (2006.01)
  *H04N 1/053* (2006.01)
  *H04N 1/113* (2006.01)
  *G03G 15/043* (2006.01)

(52) U.S. Cl.
  CPC ....... *G03G 15/0435* (2013.01); *G03G 15/043* (2013.01); *G03G 15/04072* (2013.01); *H04N 1/053* (2013.01); *H04N 1/1135* (2013.01); *H04N 2201/04713* (2013.01); *H04N 2201/04768* (2013.01)

(58) Field of Classification Search
USPC ....................................... 358/1.15
See application file for complete search history.

(56) References Cited

U.S. PATENT DOCUMENTS

| 4,532,552 A | 7/1985 | Uno | 358/302 |
| 6,825,941 B1 * | 11/2004 | Nguyen | G06F 3/1227 358/1.13 |
| 6,885,478 B1 * | 4/2005 | Salgado | H04N 1/3875 358/434 |

(Continued)

FOREIGN PATENT DOCUMENTS

| JP | S58-125064 | 7/1983 |
| JP | H10-257318 | 9/1998 |

(Continued)

*Primary Examiner* — Neil R McLean
*Assistant Examiner* — Darryl V Dottin
(74) *Attorney, Agent, or Firm* — Venable LLP

(57) ABSTRACT

An image forming apparatus includes: a halftone processing unit configured to perform halftone processing on image data by a dither matrix that includes a plurality of submatrices and decide an exposure region of an image. In at least one of a first dither matrix corresponding to a first section, and a second dither matrix corresponding to a second section adjacent to the first dither matrix in the main scanning direction and corresponding to a second section different from the first section in tone value, at least a size of an exposure region of an image formed by using a first submatrix corresponding to a predetermined tone value in the dither matrix and a size of an exposure region of an image formed by using a second submatrix corresponding to the predetermined tone value are different.

31 Claims, 27 Drawing Sheets

(56) References Cited

U.S. PATENT DOCUMENTS

| | | | |
|---|---|---|---|
| 7,111,250 B1 * | 9/2006 | Hayward | H04N 1/00204 358/1.15 |
| 7,834,897 B2 | 11/2010 | Toyama et al. | 347/132 |
| 2009/0087207 A1 | 4/2009 | Iida et al. | 399/74 |
| 2017/0343919 A1 | 11/2017 | Iida et al. | G03G 15/043 |

FOREIGN PATENT DOCUMENTS

| | | |
|---|---|---|
| JP | 2007-199556 | 8/2007 |
| JP | 2007-216470 | 8/2007 |
| JP | 2008-227770 | 9/2008 |
| JP | 2017-030309 | 2/2017 |

\* cited by examiner

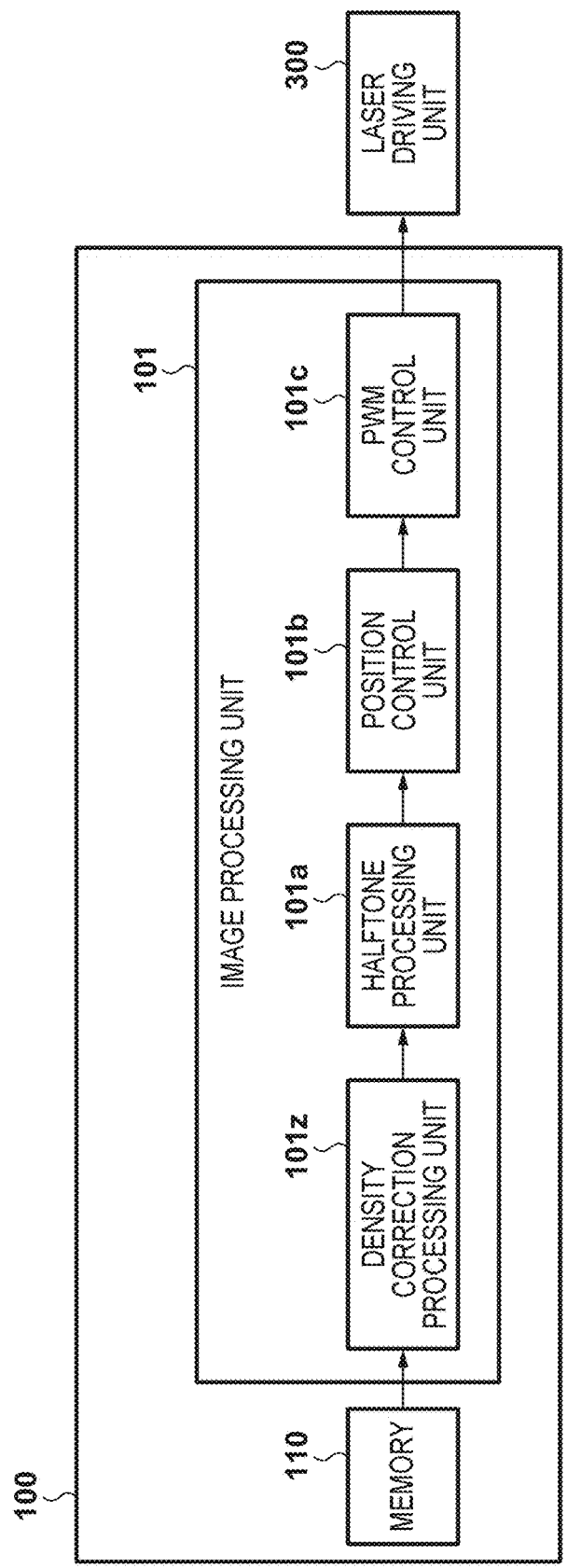

FIG. 5A

| | | | | | | | | |
|---|---|---|---|---|---|---|---|---|
| a1 | b1 | c1 | a2 | b2 | c2 | a3 | b3 | c3 |
| d1 | e1 | f1 | d2 | e2 | f2 | d3 | e3 | f3 |
| g1 | h1 | i1 | g2 | h2 | i2 | g3 | h3 | i3 |
| a4 | b4 | c4 | a5 | b5 | c5 | a6 | b6 | c6 |
| d4 | e4 | f4 | d5 | e5 | f5 | d6 | e6 | f6 |
| g4 | h4 | i4 | g5 | h5 | i5 | g6 | h6 | i6 |
| a7 | b7 | c7 | a8 | b8 | c8 | a9 | b9 | c9 |
| d7 | e7 | f7 | d8 | e8 | f8 | d9 | e9 | f9 |
| g7 | h7 | i7 | g8 | h8 | i8 | g9 | h9 | i9 |

SUBMATRIX #1, SUBMATRIX #2, SUBMATRIX #3, SUBMATRIX #4, SUBMATRIX #5, SUBMATRIX #6, SUBMATRIX #7, SUBMATRIX #8, SUBMATRIX #9

FIG. 5B

| R | C | L | R | C | L | R | C | L |
|---|---|---|---|---|---|---|---|---|
| R | C | L | R | C | L | R | C | L |
| R | C | L | R | C | L | R | C | L |
| R | C | L | R | C | L | R | C | L |
| R | C | L | R | C | L | R | C | L |
| R | C | L | R | C | L | R | C | L |
| R | C | L | R | C | L | R | C | L |
| R | C | L | R | C | L | R | C | L |
| R | C | L | R | C | L | R | C | L |

FIG. 6A-1

| LEVEL | THRESHOLD | LEVEL | THRESHOLD | LEVEL | THRESHOLD |
|---|---|---|---|---|---|
| 1 | 154 | 1 | 40 | 1 | 211 |
| 2 | 155 | 2 | 41 | 2 | 212 |
| 3 | 156 | 3 | 42 | 3 | 213 |
| 4 | 157 | 4 | 43 | 4 | 214 |
| 5 | 158 | 5 | 44 | 5 | 215 |
| 6 | 159 | 6 | 45 | 6 | 216 |
| 7 | 160 | 7 | 46 | 7 | 217 |
| 8 | 161 | 8 | 47 | 8 | 218 |
| 9 | 162 | 9 | 48 | 9 | 219 |
| 10 | 163 | 10 | 49 | 10 | 220 |
| 11 | 164 | 11 | 50 | 11 | 221 |
| 12 | 165 | 12 | 51 | 12 | 222 |
| 13 | 166 | 13 | 52 | 13 | 223 |
| 14 | 167 | 14 | 53 | 14 | 224 |
| 15 | 168 | 15 | 54 | 15 | 225 |
| 16 | 169 | 16 | 55 | 16 | 226 |
| 17 | 170 | 17 | 56 | 17 | 227 |
| 18 | 171 | 18 | 57 | 18 | 228 |
| 19 | 172 | 19 | 58 | 19 | 229 |
| 20 | 173 | 20 | 59 | 20 | 230 |
| 21 | 174 | 21 | 60 | 21 | 231 |
| 22 | 175 | 22 | 61 | 22 | 232 |
| 23 | 176 | 23 | 62 | 23 | 233 |
| 24 | 177 | 24 | 63 | 24 | 234 |
| 25 | 178 | 25 | 64 | 25 | 235 |
| 26 | 179 | 26 | 65 | 26 | 236 |
| 27 | 180 | 27 | 66 | 27 | 237 |
| 28 | 181 | 28 | 67 | 28 | 238 |
| 29 | 181 | 29 | 67 | 29 | 238 |
| 30 | 181 | 30 | 67 | 30 | 238 |
| 31 | 181 | 31 | 67 | 31 | 238 |

FIG. 6A-2

| LEVEL | THRESHOLD | LEVEL | THRESHOLD | LEVEL | THRESHOLD |
|---|---|---|---|---|---|
| 1 | 97 | 1 | 11 | 1 | 102 |
| 2 | 98 | 2 | 12 | 2 | 103 |
| 3 | 99 | 3 | 13 | 3 | 104 |
| 4 | 100 | 4 | 14 | 4 | 105 |
| 5 | 101 | 5 | 15 | 5 | 106 |
| 6 | 107 | 6 | 16 | 6 | 120 |
| 7 | 108 | 7 | 17 | 7 | 121 |
| 8 | 109 | 8 | 18 | 8 | 122 |
| 9 | 110 | 9 | 19 | 9 | 123 |
| 10 | 111 | 10 | 20 | 10 | 124 |
| 11 | 112 | 11 | 21 | 11 | 125 |
| 12 | 113 | 12 | 22 | 12 | 126 |
| 13 | 114 | 13 | 23 | 13 | 127 |
| 14 | 115 | 14 | 24 | 14 | 128 |
| 15 | 116 | 15 | 25 | 15 | 129 |
| 16 | 117 | 16 | 26 | 16 | 130 |
| 17 | 118 | 17 | 27 | 17 | 131 |
| 18 | 119 | 18 | 28 | 18 | 132 |
| 19 | 133 | 19 | 29 | 19 | 143 |
| 20 | 134 | 20 | 30 | 20 | 144 |
| 21 | 135 | 21 | 31 | 21 | 145 |
| 22 | 136 | 22 | 32 | 22 | 146 |
| 23 | 137 | 23 | 33 | 23 | 147 |
| 24 | 138 | 24 | 34 | 24 | 148 |
| 25 | 139 | 25 | 35 | 25 | 149 |
| 26 | 140 | 26 | 36 | 26 | 150 |
| 27 | 141 | 27 | 37 | 27 | 151 |
| 28 | 142 | 28 | 38 | 28 | 152 |
| 29 | 142 | 29 | 39 | 29 | 153 |
| 30 | 142 | 30 | 39 | 30 | 153 |
| 31 | 142 | 31 | 39 | 31 | 153 |

FIG. 6A-3

| LEVEL | THRESHOLD | LEVEL | THRESHOLD | LEVEL | THRESHOLD |
|---|---|---|---|---|---|
| 1 | 239 | 1 | 68 | 1 | 182 |
| 2 | 240 | 2 | 69 | 2 | 183 |
| 3 | 241 | 3 | 70 | 3 | 184 |
| 4 | 242 | 4 | 71 | 4 | 185 |
| 5 | 243 | 5 | 72 | 5 | 186 |
| 6 | 244 | 6 | 73 | 6 | 187 |
| 7 | 245 | 7 | 74 | 7 | 188 |
| 8 | 246 | 8 | 75 | 8 | 189 |
| 9 | 247 | 9 | 76 | 9 | 190 |
| 10 | 248 | 10 | 77 | 10 | 191 |
| 11 | 249 | 11 | 78 | 11 | 192 |
| 12 | 250 | 12 | 79 | 12 | 193 |
| 13 | 251 | 13 | 80 | 13 | 194 |
| 14 | 252 | 14 | 81 | 14 | 195 |
| 15 | 253 | 15 | 82 | 15 | 196 |
| 16 | 254 | 16 | 83 | 16 | 197 |
| 17 | 255 | 17 | 84 | 17 | 198 |
| 18 | 255 | 18 | 85 | 18 | 199 |
| 19 | 255 | 19 | 86 | 19 | 200 |
| 20 | 255 | 20 | 87 | 20 | 201 |
| 21 | 255 | 21 | 88 | 21 | 202 |
| 22 | 255 | 22 | 89 | 22 | 203 |
| 23 | 255 | 23 | 90 | 23 | 204 |
| 24 | 255 | 24 | 91 | 24 | 205 |
| 25 | 255 | 25 | 92 | 25 | 206 |
| 26 | 255 | 26 | 93 | 26 | 207 |
| 27 | 255 | 27 | 94 | 27 | 208 |
| 28 | 255 | 28 | 95 | 28 | 209 |
| 29 | 255 | 29 | 96 | 29 | 210 |
| 30 | 255 | 30 | 96 | 30 | 210 |
| 31 | 255 | 31 | 96 | 31 | 210 |

FIG. 6B-1

| LEVEL | THRESHOLD | LEVEL | THRESHOLD | LEVEL | THRESHOLD |
|---|---|---|---|---|---|
| 1 | 144 | 1 | 30 | 1 | 201 |
| 2 | 145 | 2 | 31 | 2 | 202 |
| 3 | 146 | 3 | 32 | 3 | 203 |
| 4 | 147 | 4 | 33 | 4 | 204 |
| 5 | 148 | 5 | 34 | 5 | 205 |
| 6 | 149 | 6 | 35 | 6 | 206 |
| 7 | 150 | 7 | 36 | 7 | 207 |
| 8 | 151 | 8 | 37 | 8 | 208 |
| 9 | 152 | 9 | 38 | 9 | 209 |
| 10 | 153 | 10 | 39 | 10 | 210 |
| 11 | 154 | 11 | 40 | 11 | 211 |
| 12 | 155 | 12 | 41 | 12 | 212 |
| 13 | 156 | 13 | 42 | 13 | 213 |
| 14 | 157 | 14 | 43 | 14 | 214 |
| 15 | 158 | 15 | 44 | 15 | 215 |
| 16 | 159 | 16 | 45 | 16 | 216 |
| 17 | 160 | 17 | 46 | 17 | 217 |
| 18 | 161 | 18 | 47 | 18 | 218 |
| 19 | 162 | 19 | 48 | 19 | 219 |
| 20 | 163 | 20 | 49 | 20 | 220 |
| 21 | 164 | 21 | 50 | 21 | 221 |
| 22 | 165 | 22 | 51 | 22 | 222 |
| 23 | 166 | 23 | 52 | 23 | 223 |
| 24 | 167 | 24 | 53 | 24 | 224 |
| 25 | 168 | 25 | 54 | 25 | 225 |
| 26 | 169 | 26 | 55 | 26 | 226 |
| 27 | 170 | 27 | 56 | 27 | 227 |
| 28 | 171 | 28 | 57 | 28 | 228 |
| 29 | 171 | 29 | 57 | 29 | 228 |
| 30 | 171 | 30 | 57 | 30 | 228 |
| 31 | 171 | 31 | 57 | 31 | 228 |

FIG. 6B-2

| LEVEL | THRESHOLD | LEVEL | THRESHOLD | LEVEL | THRESHOLD |
|---|---|---|---|---|---|
| 1 | 87 | 1 | 1 | 1 | 92 |
| 2 | 88 | 2 | 2 | 2 | 93 |
| 3 | 89 | 3 | 3 | 3 | 94 |
| 4 | 90 | 4 | 4 | 4 | 95 |
| 5 | 91 | 5 | 5 | 5 | 96 |
| 6 | 97 | 6 | 6 | 6 | 110 |
| 7 | 98 | 7 | 7 | 7 | 111 |
| 8 | 99 | 8 | 8 | 8 | 112 |
| 9 | 100 | 9 | 9 | 9 | 113 |
| 10 | 101 | 10 | 10 | 10 | 114 |
| 11 | 102 | 11 | 11 | 11 | 115 |
| 12 | 103 | 12 | 12 | 12 | 116 |
| 13 | 104 | 13 | 13 | 13 | 117 |
| 14 | 105 | 14 | 14 | 14 | 118 |
| 15 | 106 | 15 | 15 | 15 | 119 |
| 16 | 107 | 16 | 16 | 16 | 120 |
| 17 | 108 | 17 | 17 | 17 | 121 |
| 18 | 109 | 18 | 18 | 18 | 122 |
| 19 | 123 | 19 | 19 | 19 | 133 |
| 20 | 124 | 20 | 20 | 20 | 134 |
| 21 | 125 | 21 | 21 | 21 | 135 |
| 22 | 126 | 22 | 22 | 22 | 136 |
| 23 | 127 | 23 | 23 | 23 | 137 |
| 24 | 128 | 24 | 24 | 24 | 138 |
| 25 | 129 | 25 | 25 | 25 | 139 |
| 26 | 130 | 26 | 26 | 26 | 140 |
| 27 | 131 | 27 | 27 | 27 | 141 |
| 28 | 132 | 28 | 28 | 28 | 142 |
| 29 | 132 | 29 | 29 | 29 | 143 |
| 30 | 132 | 30 | 29 | 30 | 143 |
| 31 | 132 | 31 | 29 | 31 | 143 |

FIG. 6B-3

| LEVEL | THRESHOLD | LEVEL | THRESHOLD | LEVEL | THRESHOLD |
|---|---|---|---|---|---|
| 1 | 229 | 1 | 58 | 1 | 172 |
| 2 | 230 | 2 | 59 | 2 | 173 |
| 3 | 231 | 3 | 60 | 3 | 174 |
| 4 | 232 | 4 | 61 | 4 | 175 |
| 5 | 233 | 5 | 62 | 5 | 176 |
| 6 | 234 | 6 | 63 | 6 | 177 |
| 7 | 235 | 7 | 64 | 7 | 178 |
| 8 | 236 | 8 | 65 | 8 | 179 |
| 9 | 237 | 9 | 66 | 9 | 180 |
| 10 | 238 | 10 | 67 | 10 | 181 |
| 11 | 239 | 11 | 68 | 11 | 182 |
| 12 | 240 | 12 | 69 | 12 | 183 |
| 13 | 241 | 13 | 70 | 13 | 184 |
| 14 | 242 | 14 | 71 | 14 | 185 |
| 15 | 243 | 15 | 72 | 15 | 186 |
| 16 | 244 | 16 | 73 | 16 | 187 |
| 17 | 245 | 17 | 74 | 17 | 188 |
| 18 | 246 | 18 | 75 | 18 | 189 |
| 19 | 247 | 19 | 76 | 19 | 190 |
| 20 | 248 | 20 | 77 | 20 | 191 |
| 21 | 249 | 21 | 78 | 21 | 192 |
| 22 | 250 | 22 | 79 | 22 | 193 |
| 23 | 251 | 23 | 80 | 23 | 194 |
| 24 | 252 | 24 | 81 | 24 | 195 |
| 25 | 253 | 25 | 82 | 25 | 196 |
| 26 | 254 | 26 | 83 | 26 | 197 |
| 27 | 255 | 27 | 84 | 27 | 198 |
| 28 | 255 | 28 | 85 | 28 | 199 |
| 29 | 255 | 29 | 86 | 29 | 200 |
| 30 | 255 | 30 | 86 | 30 | 200 |
| 31 | 255 | 31 | 86 | 31 | 200 |

FIG. 6C-1

| LEVEL | THRESHOLD | LEVEL | THRESHOLD | LEVEL | THRESHOLD |
|---|---|---|---|---|---|
| 1 | 134 | 1 | 20 | 1 | 191 |
| 2 | 135 | 2 | 21 | 2 | 192 |
| 3 | 136 | 3 | 22 | 3 | 193 |
| 4 | 137 | 4 | 23 | 4 | 194 |
| 5 | 138 | 5 | 24 | 5 | 195 |
| 6 | 139 | 6 | 25 | 6 | 196 |
| 7 | 140 | 7 | 26 | 7 | 197 |
| 8 | 141 | 8 | 27 | 8 | 198 |
| 9 | 142 | 9 | 28 | 9 | 199 |
| 10 | 143 | 10 | 29 | 10 | 200 |
| 11 | 144 | 11 | 30 | 11 | 201 |
| 12 | 145 | 12 | 31 | 12 | 202 |
| 13 | 146 | 13 | 32 | 13 | 203 |
| 14 | 147 | 14 | 33 | 14 | 204 |
| 15 | 148 | 15 | 34 | 15 | 205 |
| 16 | 149 | 16 | 35 | 16 | 206 |
| 17 | 150 | 17 | 36 | 17 | 207 |
| 18 | 151 | 18 | 37 | 18 | 208 |
| 19 | 152 | 19 | 38 | 19 | 209 |
| 20 | 153 | 20 | 39 | 20 | 210 |
| 21 | 154 | 21 | 40 | 21 | 211 |
| 22 | 155 | 22 | 41 | 22 | 212 |
| 23 | 156 | 23 | 42 | 23 | 213 |
| 24 | 157 | 24 | 43 | 24 | 214 |
| 25 | 158 | 25 | 44 | 25 | 215 |
| 26 | 159 | 26 | 45 | 26 | 216 |
| 27 | 160 | 27 | 46 | 27 | 217 |
| 28 | 161 | 28 | 47 | 28 | 218 |
| 29 | 161 | 29 | 47 | 29 | 218 |
| 30 | 161 | 30 | 47 | 30 | 218 |
| 31 | 161 | 31 | 47 | 31 | 218 |

FIG. 6C-2

| LEVEL | THRESHOLD | LEVEL | THRESHOLD | LEVEL | THRESHOLD |
|---|---|---|---|---|---|
| 1 | 77 | 1 | 1 | 1 | 82 |
| 2 | 78 | 2 | 1 | 2 | 83 |
| 3 | 79 | 3 | 1 | 3 | 84 |
| 4 | 80 | 4 | 1 | 4 | 85 |
| 5 | 81 | 5 | 1 | 5 | 86 |
| 6 | 87 | 6 | 1 | 6 | 100 |
| 7 | 88 | 7 | 1 | 7 | 101 |
| 8 | 89 | 8 | 1 | 8 | 102 |
| 9 | 90 | 9 | 1 | 9 | 103 |
| 10 | 91 | 10 | 1 | 10 | 104 |
| 11 | 92 | 11 | 1 | 11 | 105 |
| 12 | 93 | 12 | 2 | 12 | 106 |
| 13 | 94 | 13 | 3 | 13 | 107 |
| 14 | 95 | 14 | 4 | 14 | 108 |
| 15 | 96 | 15 | 5 | 15 | 109 |
| 16 | 97 | 16 | 6 | 16 | 110 |
| 17 | 98 | 17 | 7 | 17 | 111 |
| 18 | 99 | 18 | 8 | 18 | 112 |
| 19 | 113 | 19 | 9 | 19 | 123 |
| 20 | 114 | 20 | 10 | 20 | 124 |
| 21 | 115 | 21 | 11 | 21 | 125 |
| 22 | 116 | 22 | 12 | 22 | 126 |
| 23 | 117 | 23 | 13 | 23 | 127 |
| 24 | 118 | 24 | 14 | 24 | 128 |
| 25 | 119 | 25 | 15 | 25 | 129 |
| 26 | 120 | 26 | 16 | 26 | 130 |
| 27 | 121 | 27 | 17 | 27 | 131 |
| 28 | 122 | 28 | 18 | 28 | 132 |
| 29 | 122 | 29 | 19 | 29 | 133 |
| 30 | 122 | 30 | 19 | 30 | 133 |
| 31 | 122 | 31 | 19 | 31 | 143 |

FIG. 6C-3

| LEVEL | THRESHOLD | LEVEL | THRESHOLD | LEVEL | THRESHOLD |
|---|---|---|---|---|---|
| 1 | 219 | 1 | 48 | 1 | 162 |
| 2 | 220 | 2 | 49 | 2 | 163 |
| 3 | 221 | 3 | 50 | 3 | 164 |
| 4 | 222 | 4 | 51 | 4 | 165 |
| 5 | 223 | 5 | 52 | 5 | 166 |
| 6 | 224 | 6 | 53 | 6 | 167 |
| 7 | 225 | 7 | 54 | 7 | 168 |
| 8 | 226 | 8 | 55 | 8 | 169 |
| 9 | 227 | 9 | 56 | 9 | 170 |
| 10 | 228 | 10 | 57 | 10 | 171 |
| 11 | 229 | 11 | 58 | 11 | 172 |
| 12 | 230 | 12 | 59 | 12 | 173 |
| 13 | 231 | 13 | 60 | 13 | 174 |
| 14 | 232 | 14 | 61 | 14 | 175 |
| 15 | 233 | 15 | 62 | 15 | 176 |
| 16 | 234 | 16 | 63 | 16 | 177 |
| 17 | 235 | 17 | 64 | 17 | 178 |
| 18 | 236 | 18 | 65 | 18 | 179 |
| 19 | 237 | 19 | 66 | 19 | 180 |
| 20 | 238 | 20 | 67 | 20 | 181 |
| 21 | 239 | 21 | 68 | 21 | 182 |
| 22 | 240 | 22 | 69 | 22 | 183 |
| 23 | 241 | 23 | 70 | 23 | 184 |
| 24 | 242 | 24 | 71 | 24 | 185 |
| 25 | 243 | 25 | 72 | 25 | 186 |
| 26 | 244 | 26 | 73 | 26 | 187 |
| 27 | 245 | 27 | 74 | 27 | 188 |
| 28 | 245 | 28 | 75 | 28 | 189 |
| 29 | 245 | 29 | 76 | 29 | 190 |
| 30 | 245 | 30 | 76 | 30 | 190 |
| 31 | 245 | 31 | 76 | 31 | 190 |

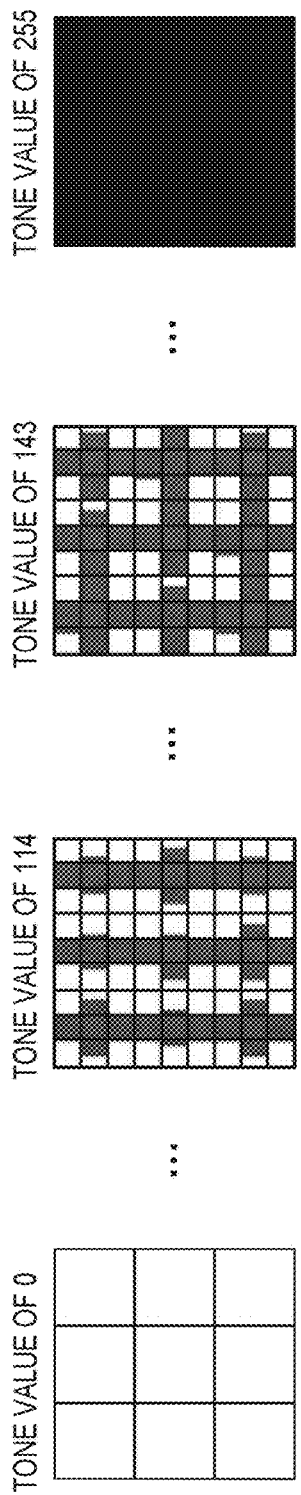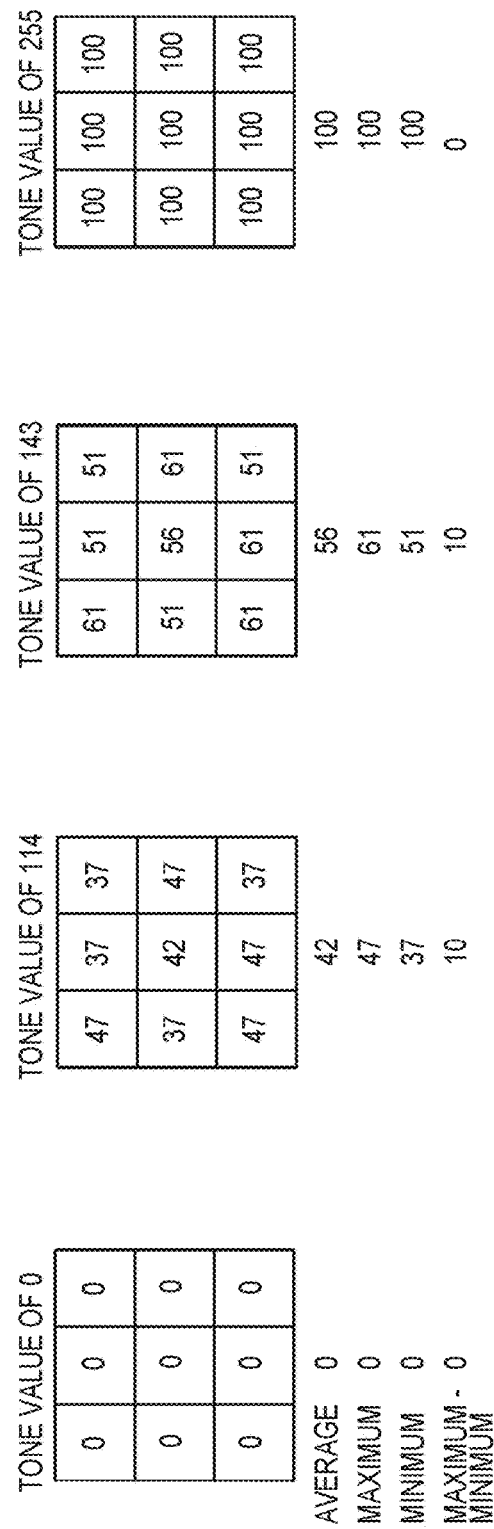

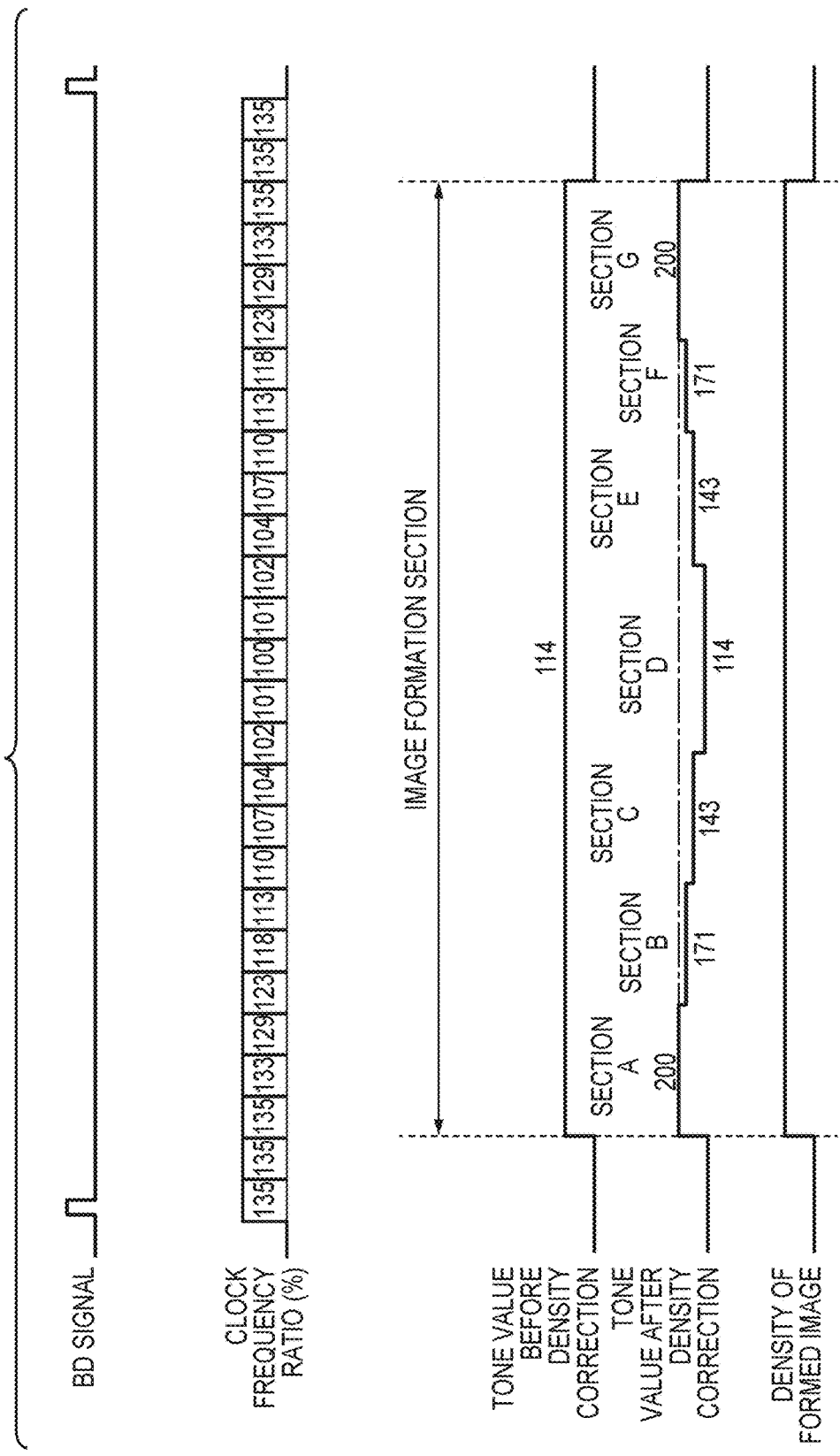

IT IS DIFFICULT TO RECOGNIZE BOUNDARY PORTION VISUALLY

F I G. 12
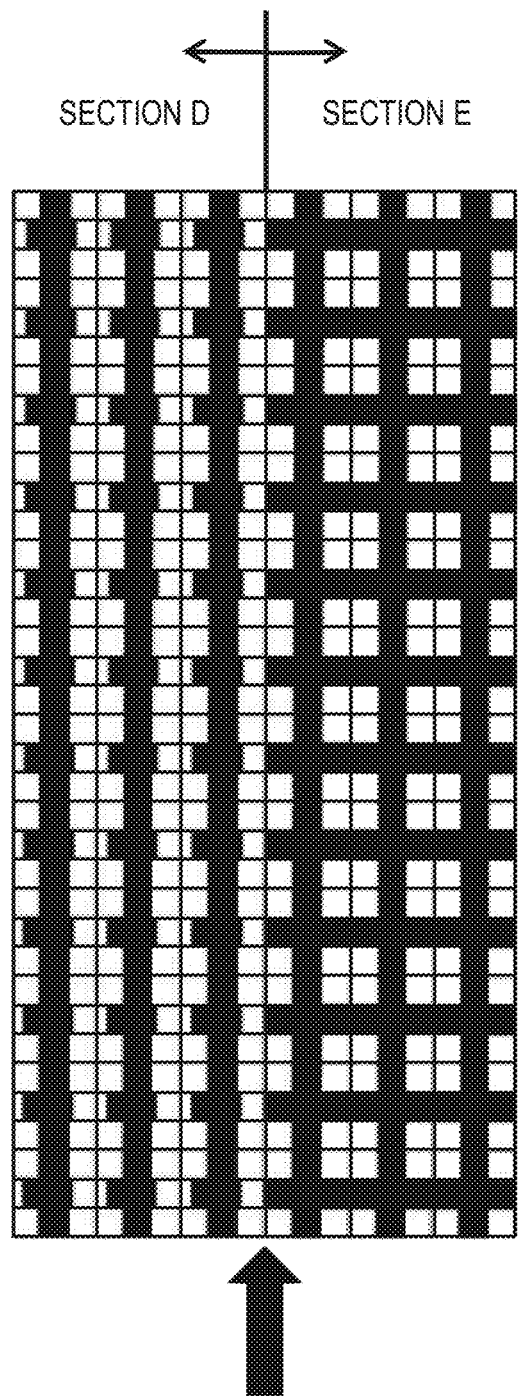
BOUNDARY PORTION IS VISUALLY RECOGNIZABLE

BOUNDARY PORTION IS NOT VISUALLY RECOGNIZABLE

IT IS DIFFICULT TO RECOGNIZE BOUNDARY PORTION VISUALLY

BOUNDARY PORTION IS NOT VISUALLY RECOGNIZABLE

IMAGE FORMING APPARATUS FOR SCANNING LIGHT BEAM AT NON-UNIFORM SCAN SPEED AND EXPOSING PHOTOSENSITIVE MEMBER

BACKGROUND OF THE INVENTION

Field of the Invention

The present invention relates to an electrophotographic image forming apparatus such as a laser beam printer, a digital copying machine, or a digital FAX.

Description of the Related Art

An electrophotographic image forming apparatus includes an optical scanning apparatus configured to expose a photosensitive member. The optical scanning apparatus scans/exposes the photosensitive member by emitting a light beam based on image data, reflecting the emitted light beam by a rotating polygonal mirror, and transmitting it through a scan lens having a fθ characteristic. Note that the fθ characteristic refers to an optical characteristic that causes a spot by the light beam to move on the surface of the photosensitive member at a uniform velocity by rotating the rotating polygonal mirror at a uniform angular velocity. However, the scan lens having the fθ characteristic is large in size and becomes a factor that increases the size of the image forming apparatus. Therefore, not using the scan lens itself, or using the scan lens without the fθ characteristic is considered. Japanese Patent Laid-Open No. S58-125064 discloses an arrangement that changes a clock frequency so as to make a pixel width formed on a photosensitive member constant even if a spot by a light beam does not move on the surface of the photosensitive member at a uniform velocity.

Even if the pixel width is made constant by changing the clock frequency, however, an exposure amount per unit area of the photosensitive member changes by a variation in scan speed. This difference in exposure amount can be a cause of an image failure.

SUMMARY OF THE INVENTION

According to an aspect of the present invention an image forming apparatus includes: a photosensitive member; an irradiation unit configured to form an electrostatic latent image on the photosensitive member by scanning a laser beam at a non-uniform scan speed with respect to a main scanning direction and exposing the photosensitive member; a correction unit configured to generate second image data by performing correction processing for correcting a tone value of a pixel in first image data in accordance with a position in the main scanning direction; and a halftone processing unit configured to perform halftone processing on the second image data by a dither matrix that includes a plurality of submatrices each including a plurality of pixels and decide an exposure region of an image formed by the irradiation unit. In at least one of a first dither matrix corresponding to a first section, and a second dither matrix corresponding to a second section adjacent to the first dither matrix in the main scanning direction and corresponding to a second section different from the first section in tone value, at least a size of an exposure region of an image formed by using a first submatrix corresponding to a predetermined tone value in the dither matrix and a size of an exposure region of an image formed by using a second submatrix corresponding to the predetermined tone value are different.

Further features of the present invention will become apparent from the following description of exemplary embodiments with reference to the attached drawings.

BRIEF DESCRIPTION OF THE DRAWINGS

FIG. 4 is a block diagram showing the arrangement of an image signal generation unit according to an embodiment;

FIG. 5A is a view showing a dither matrix according to an embodiment;

FIG. 5B is a view showing a position control matrix according to an embodiment;

FIGS. 6A-1 to 6A-3, 6B-1 to 6B-3 and 6C-1 to 6C-3 are tables for explaining halftone processing according to an embodiment;

FIG. 8A shows views of the relationships between tone values and exposure regions according to an embodiment;

FIG. 8B shows views of the exposure area ratios of submatrices in each of some tone values according to an embodiment;

FIG. 9 is a sequence chart for explaining density correction processing according to an embodiment;

FIG. 12 is a view showing an exposure pattern in the section boundary;

DESCRIPTION OF THE EMBODIMENTS

Exemplary embodiments of the present invention will be described below with reference to the accompanying drawings. Note that the following embodiments are merely examples and do not limit the present invention to the contents of the embodiments. The constituent elements unnecessary for the description of the embodiments are not illustrated in the following drawings.

First Embodiment

Figure 1:
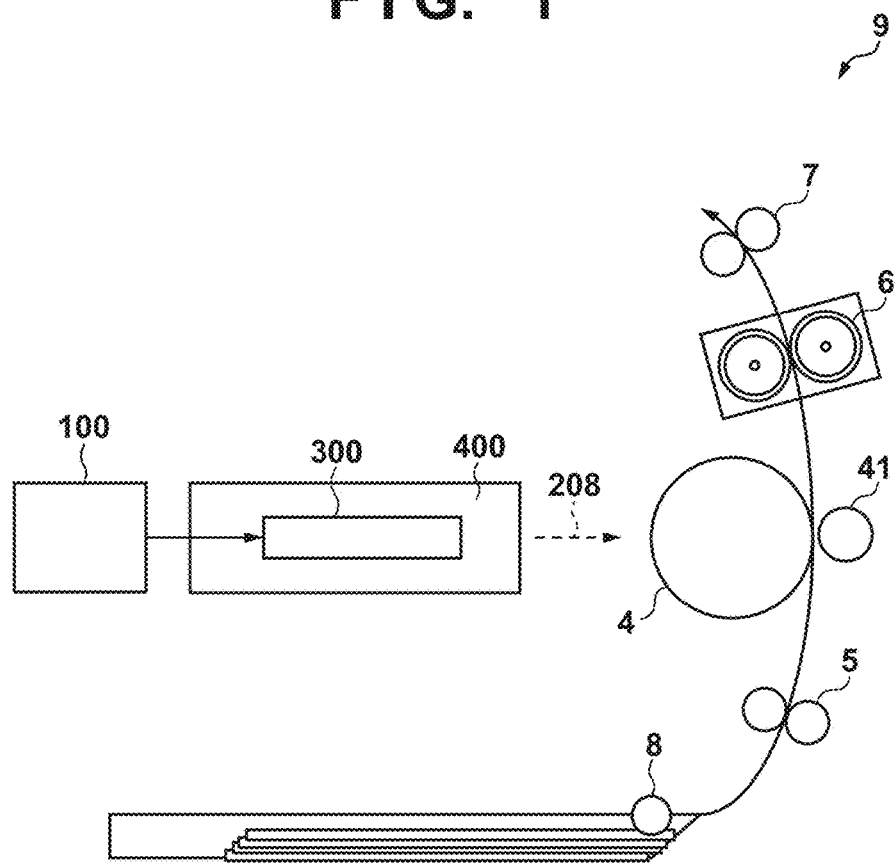
FIG. 1 is a view showing the arrangement of an image forming apparatus according to an embodiment.

FIG. 1 is a view showing the schematic arrangement of an image forming apparatus 9 according to this embodiment. A laser driving unit 300 of an optical scanning apparatus 400 emits a light beam 208 based on image data output from an image signal generation unit 100. This light beam 208 scans/exposes a photosensitive member 4 charged by a charging unit (not shown) and forms a latent image on the surface of the photosensitive member 4. A developing unit (not shown) develops this latent image with toner and forms a toner image. A recording medium fed from a feeding unit 8 is conveyed by conveyance rollers 5 to a nip region between the photosensitive member 4 and a transfer roller 41. The transfer roller 41 transfers the toner image formed on the photosensitive member 4 to this recording medium. The recording medium is then conveyed to a fixing unit 6. The fixing unit 6 fixes the toner image to the recording medium by heating/pressurizing the recording medium. The recording medium to which the toner image is fixed is discharged outside the image forming apparatus 9 by discharge rollers 7.

Figure 2A:
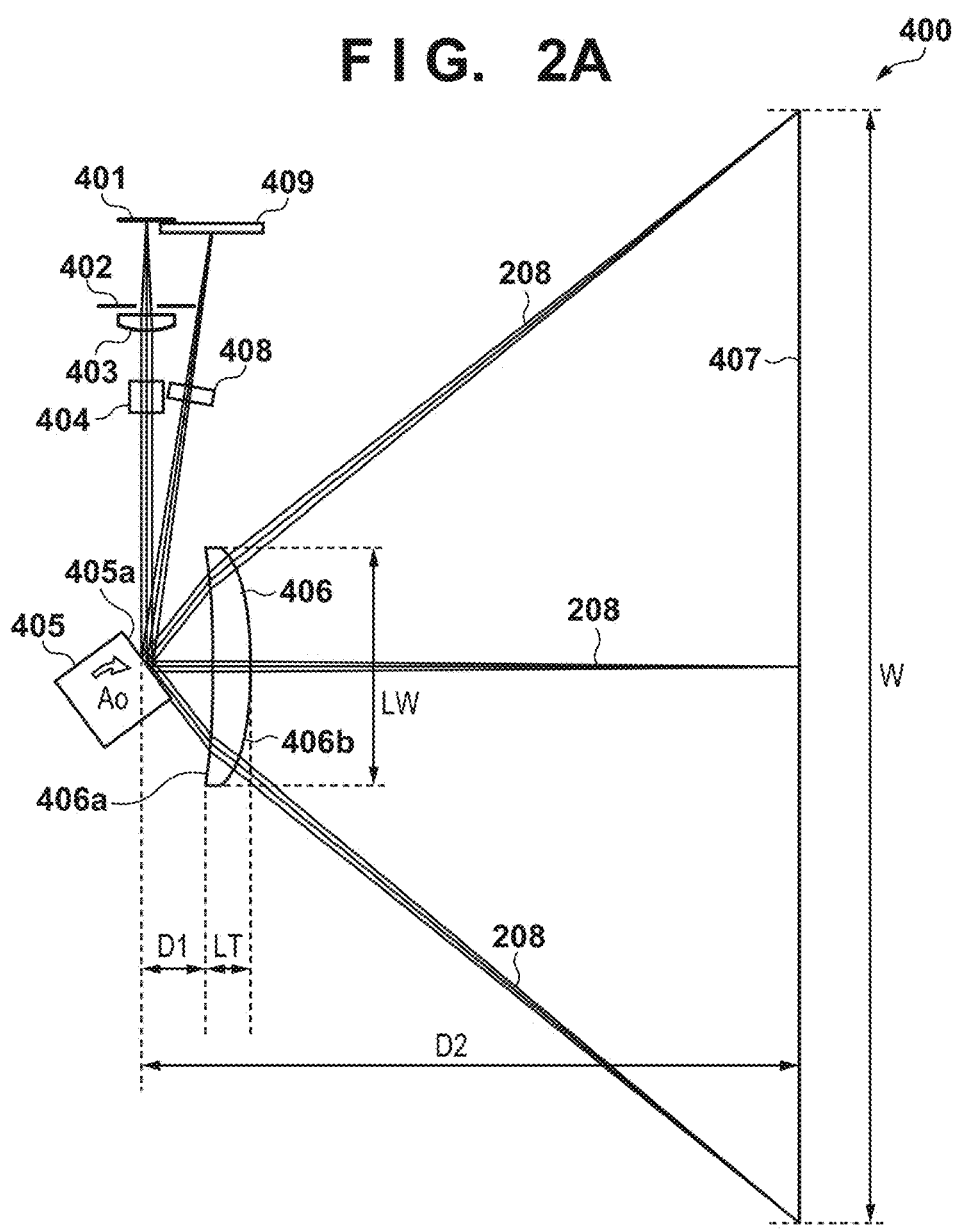
FIGS. 2A and 2B are views each showing the arrangement of an optical scanning apparatus according to an embodiment.
Figure 2B:
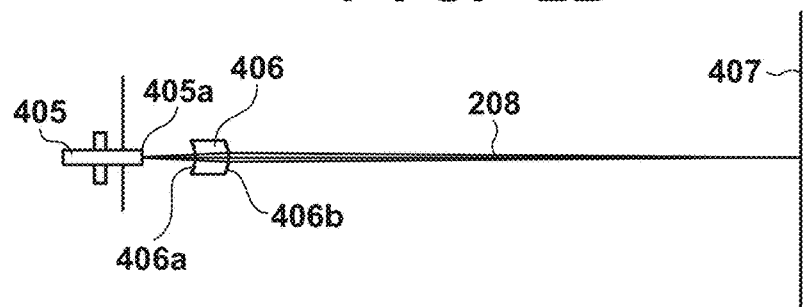

FIGS. 2A and 2B are views each showing the arrangement of the optical scanning apparatus 400 according to this embodiment. FIG. 2A is a sectional view showing the optical scanning apparatus 400 in a main scanning direction. FIG. 2B is a sectional view showing the optical scanning apparatus 400 in a sub-scanning direction. The light beam (light flux) 208 emitted by a light source 401 is shaped into a circular shape by an aperture stop 402 and enters a coupling lens 403. The light beam 208 that has passed through the coupling lens 403 is converted into almost parallel light and enters an anamorphic lens 404. Note that the almost parallel light includes weak converging light and weak diverging light. The anamorphic lens 404 has a positive refractive power in a main scanning section and converts the incident light flux into converging light in the main scanning section. The anamorphic lens 404 also condenses the light flux near a reflecting surface 405a of a deflector 405 in a sub-scanning section and forms a line image long in the main scanning direction.

Then, the light flux that has passed through the anamorphic lens 404 is reflected on the reflecting surface 405a of the deflector (polygonal mirror) 405. The light beam 208 reflected on the reflecting surface 405a performs irradiation/exposure of the photosensitive member 4 by being transmitted through an imaging lens 406, forming an image on the surface of the photosensitive member 4, and forming a predetermined spot-like image (to be referred to as a spot hereinafter). By rotating the deflector 405 at a predetermined angular velocity in the direction of an arrow Ao with a driving unit (not shown), the spot moves in the main scanning direction on a scanning target surface 407 of the photosensitive member 4, and an electrostatic latent image is formed on the scanning target surface 407. Note that the main scanning direction is a direction parallel to the surface of the photosensitive member 4 and perpendicular to a moving direction on the surface of the photosensitive member 4. The sub-scanning direction is a moving direction on the surface of the photosensitive member 4.

A Beam Detect (to be referred to as BD hereinafter) sensor 409 and a BD lens 408 are sync optical systems that decide a timing to write the electrostatic latent image on the scanning target surface 407. The light beam 208 that has passed through the BD lens 408 enters the BD sensor 409 with a photodiode and is detected. The write timing is controlled based on a timing at which the BD sensor 409 detects the light beam 208. The light source 401 of this embodiment includes one light emitting unit. However, a plurality of light emitting units capable of controlling light emission independently may be included as the light source 401.

As shown in FIG. 2A, the imaging lens 406 has two optical surfaces (lens surfaces) of an incident surface 406a and an exit surface 406b. The imaging lens 406 is configured to scan the light flux deflected on the reflecting surface 405a on the scanning target surface 407 with desired scan characteristics in the main scanning section. The imaging lens 406 is also configured to form the spot of the light beam 208 on the scanning target surface 407 into a desired shape.

The imaging lens 406 does not have a so-called fθ characteristic. That is, when the deflector 405 rotates at the uniform angular velocity, the spot does not move on the scanning target surface 407 at a uniform velocity. By using the imaging lens 406 without the fθ characteristic, it becomes possible to arrange the imaging lens 406 near the deflector 405 (at a position with a small distance D1). The imaging lens 406 without the fθ characteristic can have a smaller length (width LW) in the main scanning direction and a smaller length (thickness LT) in an optical axis direction than an imaging lens with the fθ characteristic. Thus, a decrease in size of the optical scanning apparatus 400 is implemented. In the case of a lens having the fθ characteristic, there may be abrupt changes in shapes of the incident surface and the exit surface of the lens when viewed on the main scanning section. If such shape restrictions exist, satisfactory imaging performance may not be obtained. In contrast, in the case of the imaging lens 406 without the fθ characteristic, abrupt changes in shapes of the incident surface and the exit surface of the lens when viewed on the main scanning section are small, making it possible to obtain satisfactory imaging performance. Note that the imaging lens 406 may be a lens that has the fθ characteristic in some regions in the main scanning direction and does not have the fθ characteristic in other regions.

Figure 3:
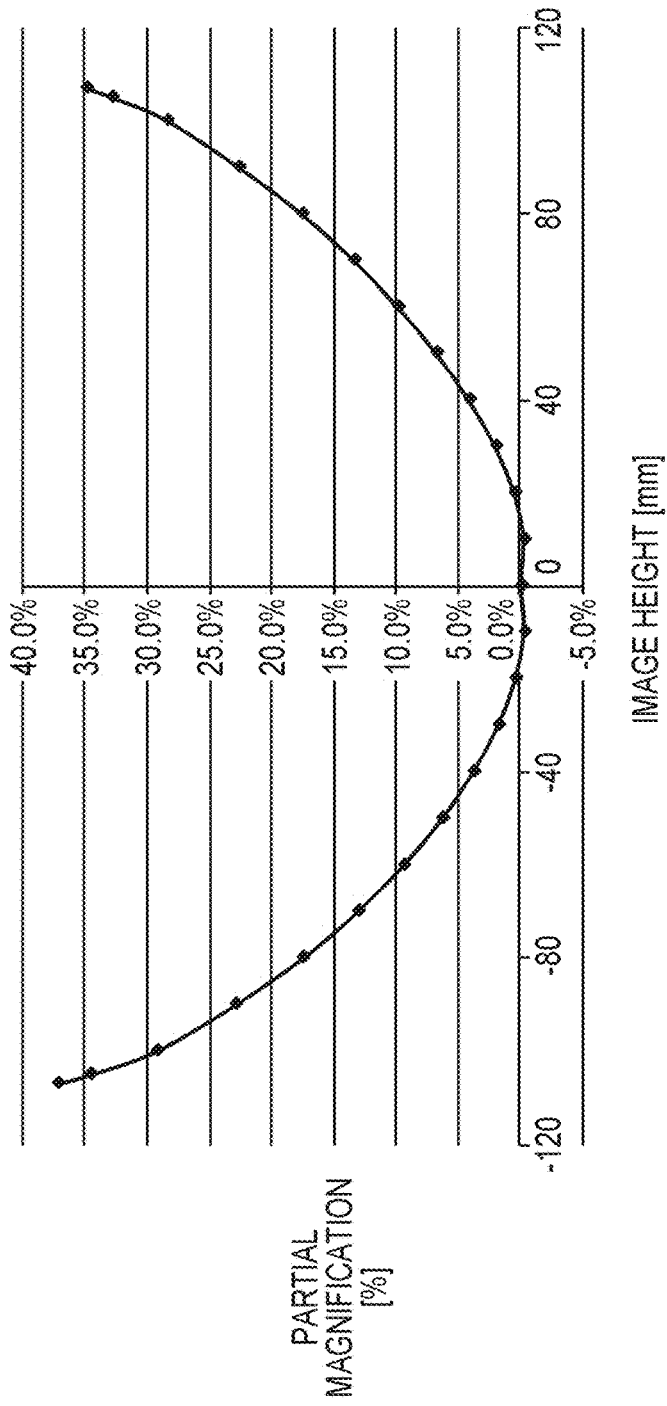
FIG. 3 is a graph showing the relationship between an image height and a partial magnification.

FIG. 3 shows the relationship between an image height and a partial magnification according to this embodiment. Note that an image height 0 is obtained when the spot is on the optical axis of the imaging lens 406, and will be referred to as an on-axis image height hereinafter. An image height other than the on-axis image height will be referred to as an off-axis image height hereinafter. Furthermore, the maximum value of absolute values of the image height will be referred to as a most off-axis image height. As shown in FIG. 2A, let W/2 be a position of the most off-axis image height on the scanning target surface 407. In FIG. 3, for example, the partial magnification of 30% of the image height means that a scan speed at the image height is 1.3 times that of the image magnification of 0%. In an example of FIG. 3, a scan speed at the on-axis image height is the lowest, and the scan speed becomes higher as the absolute value of the image height becomes larger. Therefore, if a pixel width in the main scanning direction is decided at a predetermined time interval decided by a clock cycle, a pixel density is different between the on-axis image height and the off-axis image height. Therefore, in this embodiment, partial magnification correction is performed. More specifically, partial magnification correction is performed by performing image clock correction that corrects the frequency of an image clock in accordance with the image height such that the pixel width becomes almost constant regardless of the image height.

A time required to scan a unit length when the image height on the scanning target surface 407 is near the most off-axis image height becomes shorter than a time required to scan the unit length when the image height is near the on-axis image height. This means that if the emission luminance of the light source 401 is constant, a total exposure amount per unit length (to be simply referred to as an exposure amount per unit length hereinafter) when the image height is near the most off-axis image height becomes smaller than the exposure amount per unit length when the image height is near the on-axis image height. Therefore, in this embodiment, density correction (tone correction) is performed in addition to the above-described partial magnification correction in order to obtain satisfactory image quality.

FIG. 4 is a block diagram showing the arrangement of the image signal generation unit 100. Image data from a host computer (not shown) is stored in a memory 110. Note that in this example, the image data indicates the tone of each pixel by 8 bits. A density correction processing unit 101z of an image processing unit 101 performs density correction processing on the image data of the memory 110. Note that details of the density correction processing will be described later. A halftone processing unit 101a performs halftone processing on image data after density correction and outputs image data that indicates the tone of each pixel by 5 bits.

One example of processing in the halftone processing unit 101a will be described below. As shown in FIG. 5A, in this embodiment, a dither matrix formed by a total of 81 pixels a1 to i9 including nine pixels in the main scanning direction (a right-and-left direction in FIG. 5A) and nine pixels in the sub-scanning direction (a vertical direction in FIG. 5A) is used. The dither matrix includes submatrices #1 to #9 each formed by a total of nine pixels including three pixels in the main scanning direction and three pixels in the sub-scanning direction. In each submatrix, an exposure region increases along with an increase in tone value, increasing a development region developed with toner.

FIGS. 6A-1 to 6A-3 show the relationship between a level and a threshold regarding each of the pixels ax to ix (x=2, 3, 4, and 9) of the submatrices #2, #3, #4, and #9 in FIG. 5A. Note that the left column, the central column, and the right column in FIG. 6A-1 show the relationship of the pixel ax, bx and cx respectively The left column, the central column, and the right column in FIG. 6A-2 shows the relationship of the pixel dx, ex and fx respectively. The left column, the central column, and the right column in FIG. 6A-3 shows the relationship of the pixel gx, hx and ix respectively. FIGS. 6B-1 to 6B-3 show the relationship between a level and a threshold regarding each of the pixels a5 to i5 of the submatrix #5. Note that the arrangement of tables in FIGS. 6B-1 to 6B-3 is the same as that of FIGS. 6A-1 to 6A-3. FIGS. 6C-1 to 6C-3 show the relationship between a level and a threshold regarding each of the pixels ax to ix (x=1, 6, 7, and 8) of the submatrices #1, #6, #7, and #8 in FIG. 5A. Note that the arrangement of tables in FIG. 6C-1 to 6C-3 is the same as that of FIGS. 6A-1 to 6A-3. The halftone processing unit 101a compares a tone value (pixel value) of input image data with the threshold of a corresponding pixel of the tables in FIGS. 6A-1 to 6A-3, 6B-1 to 6B-3 and 6C-1 to 6C-3 and outputs a corresponding level. Note that the threshold of the tables in FIGS. 6A-1 to 6A-3, 6B-1 to 6B-3 and 6C-1 to 6C-3 means a range equal to or larger than the threshold and smaller than a threshold corresponding to a level higher by one in value. Note that if an input tone value is smaller than a threshold corresponding to level 1, the halftone processing unit 101a outputs 0 as a level.

For example, if the tone value of the pixel a1 is 136, the halftone processing unit 101a outputs 3 as a level as shown in FIG. 6C-1. On the other hand, if the tone level of the pixel a2 is 136, the halftone processing unit 101a outputs 0 as a level as shown in FIG. 6A-1. Note that if there are a plurality of cases in which a threshold range is at the same level, the halftone processing unit 101a outputs the highest level. Therefore, if the tone value of the pixel a1 is equal to or larger than 161, the halftone processing unit 101a outputs 31 as a level. Similarly, if the tone value of the pixel a2 is equal to or larger than 181, the halftone processing unit 101a outputs 31 as the level.

Referring back to FIG. 4, a position control unit 101b adds 2-bit position control data indicating a growing direction to 5-bit image data after halftone processing and outputs the added image data to a PWM control unit 101c. Details of processing in the position control unit 101b will be described below. FIG. 5B shows a position control matrix in this example. Each square of the position control matrix in FIG. 5B indicates one pixel, and its position corresponds to the position of each pixel of the dither matrix in FIG. 5A. Referring to FIG. 5B, "R" is set in the left column of each submatrix, "C" is set in the central column of each submatrix, and "L" is set in the right column of each submatrix. Note that each of "R", "C", and "L" is encoded by 2 bits. For example, "R"="01", "C"="00", and "L"="10".

Position control data indicates the growing direction of a dot in each pixel. More specifically, "R" indicates that a dot grows from the right end to left side of the pixel. Further, "C" indicates that a dot grows from the center to both right and left directions of the pixel. Furthermore, "L" indicates that a dot grows from the left end to right side of the pixel. The position control unit 101b adds 2-bit position control data to each pixel of image data after dither processing and outputs added data to the PWM control unit 101c.

Figure 7:
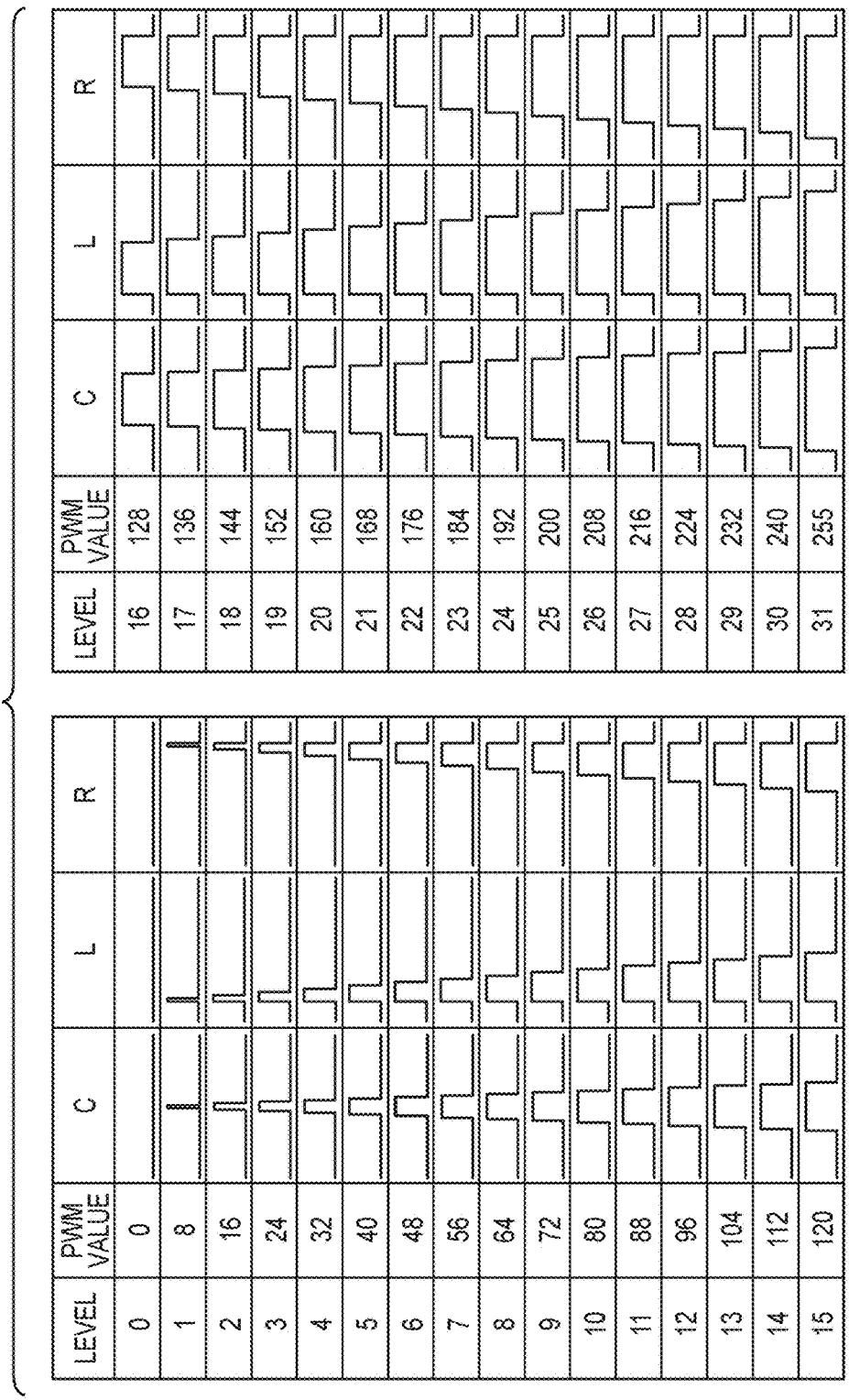
FIG. 7 is a table for explaining generation of a PWM signal according to an embodiment.

Based on 7-bit image data to which position control data is added, the PWM control unit 101c generates a PWM signal and outputs the generated signal to the laser driving unit 300. FIG. 7 is a table for explaining generation of the PWM signal by the PWM control unit 101c. With respect to one pixel, the PWM control unit 101c extracts 5 bits indicating its level and 2 bits of position control data. Then, based on the position control data and the level, the PWM control unit 101c generates the PWM signal shown in FIG. 7. In this embodiment, as shown in FIG. 7, during levels 0 to 31, the pulse width (corresponding to an exposure time) of the PWM signal increases along with an increase in level. Note that as described above, if position control data is "C", an exposure region is increased sequentially from the center of each pixel. Similarly, if position control data is "L", an exposure region is increased sequentially from the left end of each pixel, and if control data is "R", an exposure region is increased sequentially from the right end of each pixel. Note that a PWM value indicates the pulse width of the PWM signal, and a value of 255 means exposing an entire pixel. Thus, in this embodiment, the halftone processing unit 101a, the position control unit 101b, and the PWM control unit 101c perform halftone processing on image data after density correction processing and determines an exposure region of an image to be formed.

FIG. 8A shows views of the relationships between tone values and exposure regions of respective submatrices when 81 pixels in the dither matrix all have the same tone value, and shows a representative case in which the tone values are 0, 114, 143, and 255. Note that black portions in FIG. 8A correspond to the exposure regions. In the tone value of 0 (solid white image), all the regions of the respective submatrices are not exposed. In the tone value of 114 and the tone value of 143, a predetermined range of each submatrix is exposed. In the tone value of 255 (solid black image), all the regions of all the submatrices are exposed.

FIG. 8B shows the respective exposure area ratios of a plurality of submatrices in the dither matrix regarding the respective tone values of 0, 114, 143, and 255. Note that each exposure area ratio refers to the ratio of the size of the exposure region to the size of the submatrix. In the tone value of 0, all the submatrices do not include the exposure regions, and the exposure area ratios of the submatrices #1 to #9 are all 0%. Thus, the average value, maximum value, minimum value, and maximum value−minimum value of the exposure area ratios in the respective submatrices are all 0%. In the tone value of 114, the exposure area ratio of the submatrix #5 is 42%, the exposure area ratios of the submatrices #1, #6, #7, and #8 are 47%, and the exposure area ratios of the submatrices #2, #3, #4, and #9 are 37%. Thus, the exposure area ratios in the respective submatrices have the average value of 42%, the maximum value of 47%, the minimum value of 37%, and the maximum value−the minimum value of 10%. In the tone value of 143, the exposure area ratio of the submatrix #5 is 56%, the exposure area ratios of the submatrices #1, #6, #7, and #8 are 61%, and the exposure area ratios of the submatrices #2, #3, #4, and #9 are 51%. Thus, the average value is 56%, the maximum value is 61%, the minimum value is 51%, and the maximum value−the minimum value is 10%. In the tone value of 255, all the regions of the respective submatrices are exposed, and the exposure area ratios of the submatrices #1 to #9 are all 100%. Thus, the average value, the maximum value, and the minimum value are all 100%, and the maximum value—minimum value is 0%.

Density correction processing in the density correction processing unit 101z will now be described. As described above, the optical scanning apparatus 400 of this embodiment has a higher scan speed at the off-axis image height than at the on-axis image height. That is, the scan speed changes in accordance with a position in the main scanning direction. Therefore, in this embodiment, a clock rate is adjusted to suppress a variation in width of one pixel in the main scanning direction owing to the image height. More specifically, as shown in FIG. 9, an image clock frequency at the on-axis image height is set at 100%, and the image clock frequency is increased toward the most off-axis image height. In the optical scanning apparatus 400 according to this embodiment, a partial magnification at the most off-axis image height is 35%, and thus an image clock frequency at the most off-axis image height is set at 135%.

It is possible to suppress a variation in pixel size owing to the image height by adjusting an image clock frequency. However, an exposure amount per unit length decreases if an absolute value of the image height increases due to a variation in scan speed. Therefore, in this embodiment, the density correction processing unit 101z corrects the tone value of each pixel indicated by image data in order to suppress a density variation. FIG. 9 shows density correction processing in a case in which the tone values of all the pixels in the main scanning direction are 114. In this embodiment, the main scanning direction is divided into seven sections A to G, and correction is performed by using each section as a unit. Referring to FIG. 9, the corrected tone values of the sections A and G each having the most off-axis image height are 200. The corrected tone values of the sections B and F on the side of the on-axis image height of each of the sections A and G are 171. The corrected tone values of the sections C and E on the side of the on-axis image height of each of the sections B and F are 143. Then, the corrected tone value of the section D having the on-axis image height is 114. Thus, in this embodiment, correction is performed, which increases the tone values as the scan speed becomes higher with reference to the on-axis image height. Consequently, the density variation owing to the image height is suppressed. Note that depending on an image density or development characteristics, characteristics may be shown, that an image density increases as the scan speed becomes higher with reference to the on-axis image height. In this case, correction may be performed, which decreases the tone values as the scan speed becomes higher with reference to the on-axis image height. Note that correction information for each section used for density correction by the density correction processing unit 101z is obtained in advance based on the exposure sensitivity characteristics of the photosensitive member 4 or the development characteristics of toner and stored in the density correction processing unit 101z. Note that the correction information is information indicating the relationship between a tone value before correction and a tone value after correction for each section.

Figure 10:
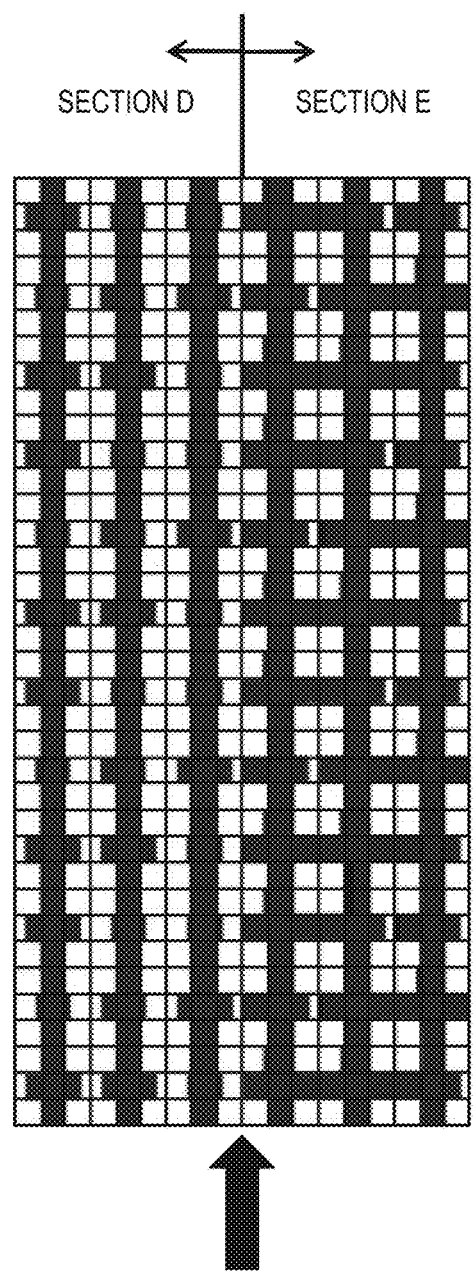
FIG. 10 is a view showing an exposure pattern in a section boundary according to an embodiment.

FIG. 10 shows an exposure pattern of an image in which the tone values of all the pixels are 114. Note that FIG. 10 shows an exposure pattern of two and four dither matrices in the main scanning direction and the sub-scanning direction, respectively, which includes a boundary between the section D and the section E. As shown in FIG. 9, the tone value of the section D after density correction processing is 114, and the tone value of the section E is 143. As described with reference to FIG. 8B, the average value of the exposure area ratios in the dither matrix is 42% in the tone value of 114, and the average value of the exposure area ratios in the dither matrix is 56% in the tone value of 143. This makes it possible to reduce a difference between an average density in the entire section D and an average density in the entire section E even if the exposure amount per unit length changes due to the image height. On the other hand, in the vicinity of the boundary between the section D and the section E, a difference in exposure amount per unit length is small and can be regarded as almost constant. In this case, if the exposure area ratios of submatrices on two sides of a boundary are constant along the sub-scanning direction, it becomes easier to visually recognize a density difference on the two sides of this boundary. In this embodiment, however, the exposure area ratio of each submatrix in the dither matrix changes in the main scanning direction and the sub-scanning direction. A slight density change is caused in each dither matrix by thus changing the exposure area ratio of each submatrix in the dither matrix in both the main scanning direction and the sub-scanning direction. As a result, boundary portions are mixed, making it difficult to visually recognize a density step. That is, it is possible to suppress visual recognition of a section boundary obtained by a density difference appearing as a vertical stripe.

As described above, in the image forming apparatus according to this embodiment, the tone value is converted in accordance with each section along the main scanning direction by density correction processing. This suppresses the density variation owing to the image height. Furthermore, the size of the exposure area ratio (exposure region) of each submatrix is changed in the main scanning direction and the sub-scanning direction by halftone processing. For example, in this embodiment, the first submatrices (submatrices #2, #3, #4, and #9) whose exposure areas are decided by FIGS. 6A-1 to 6A-3 and the second submatrices (submatrices #1, #6, #7, and #8) whose exposure areas are decided by FIGS. 6C-1 to 6C-3 are provided. If the tone values of all the pixels are the same in the first submatrices and the second submatrices, the exposure regions are increased along with increases in the tone values. However, the ways of the increases are different. That is, in the first submatrices and the second submatrices, the sizes of the exposure regions are different if the tone values of all the pixels are the same, and are different from their maximum value (255) and minimum value (0). Then, in this embodiment, the submatrices are arranged such that at least one first submatrix and one second submatrix exist in the main scanning direction and the sub-scanning direction of the dither matrix. This suppresses occurrence of a vertical stripe-like image failure in a boundary portion between two adjacent sections.

Figure 11A:
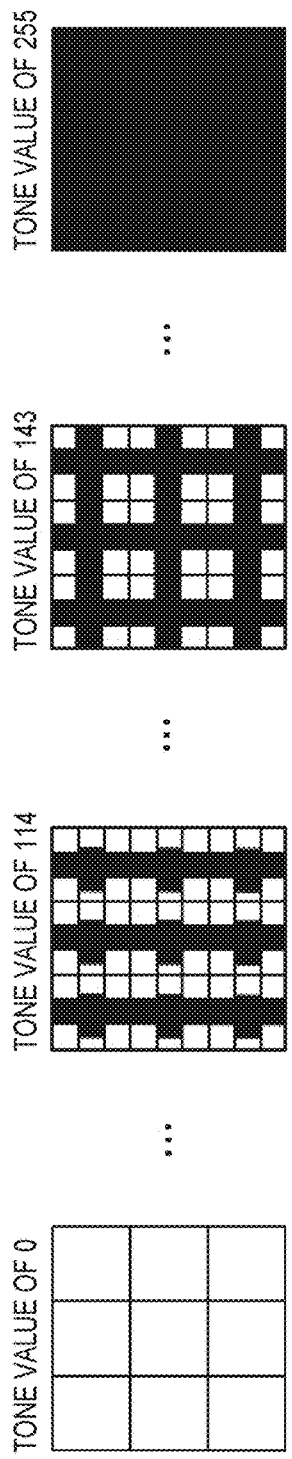
FIG. 11A shows views of the relationships between the tone values and the exposure regions.
Figure 11B:
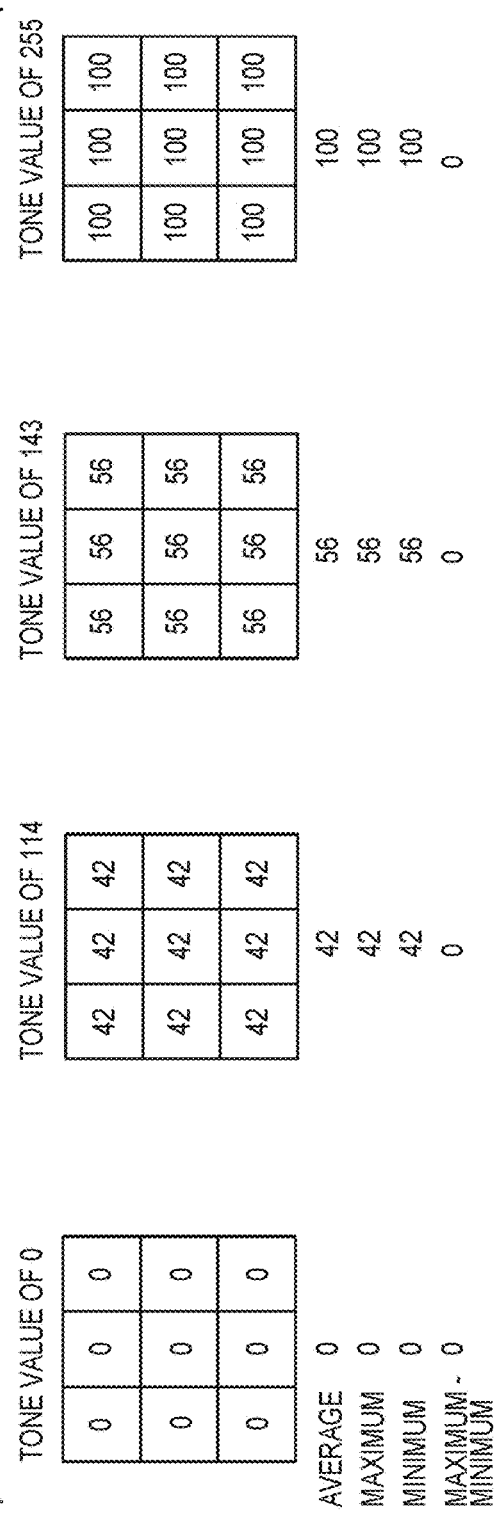
FIG. 11B shows views of the exposure area ratios of the submatrices in some tone values.

For example, as shown in FIG. 11A, halftone processing for making the exposure area ratios of the respective submatrices in the dither matrix equal to each other will be considered. FIG. 11A shows a case in which tone values are 0, 114, 143, and 255 as in FIG. 8A. FIG. 11B shows the exposure area ratio of each submatrix to a corresponding one of the tone values as in FIG. 8B. The exposure area ratios of the respective submatrices in the tone values of 0, 114, 143, and 255 are, respectively, 0%, 42%, 56%, and 100%.

FIG. 12 shows an exposure pattern of an image in which the tone values of all pixels are 114 when the halftone processing shown in FIG. 11A is performed. Note that as in FIG. 10, FIG. 12 shows a boundary between the section D and the section E. As described with reference to FIG. 9, after density correction processing, the tone value of the section D is 114, and the tone value of the section E is 143. As described with reference to FIG. 11B, the average value of the exposure area ratios in the section D is 42%, and the average value of the exposure area ratios in the section E is 56%. Accordingly, a difference between an average density in the entire section D and an average density in the entire section E becomes smaller from a difference in exposure amount per unit area owing to an image height. However, the exposure area ratio of each submatrix in the dither matrix is also constant, causing no slight density change in the dither matrix. Furthermore, a difference in exposure amount per unit area is small between the boundary side of the section D and the boundary side of the section E. As a result, a density step caused between the section D and the section E continues in the sub-scanning direction, making it easier to visually recognize the boundary portion.

Second Embodiment

The second embodiment will now be described mainly concerning the difference from the first embodiment. In this embodiment, in halftone processing, a change in exposure area ratio of each submatrix in a dither matrix is made larger, suppressing occurrence of a stripe-like image failure in a sub-scanning direction more stably.

Figure 13A:
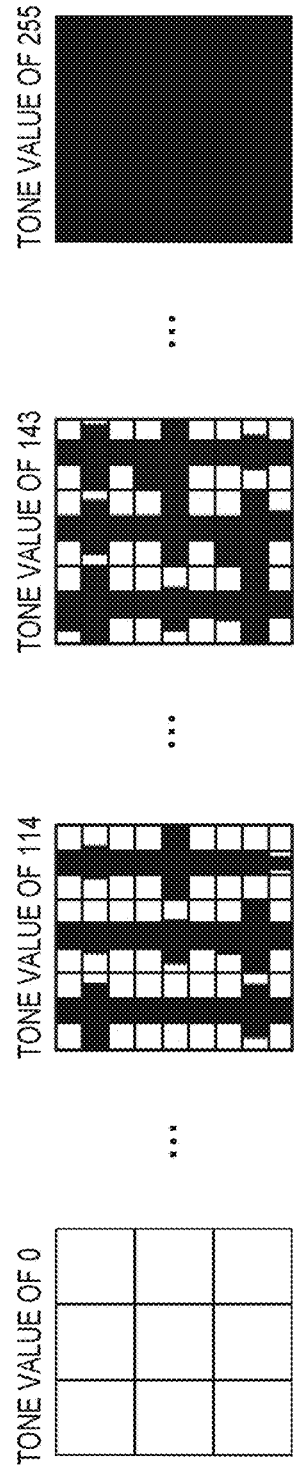
FIG. 13A shows views of the relationships between tone values and exposure regions according to an embodiment.
Figure 13B:
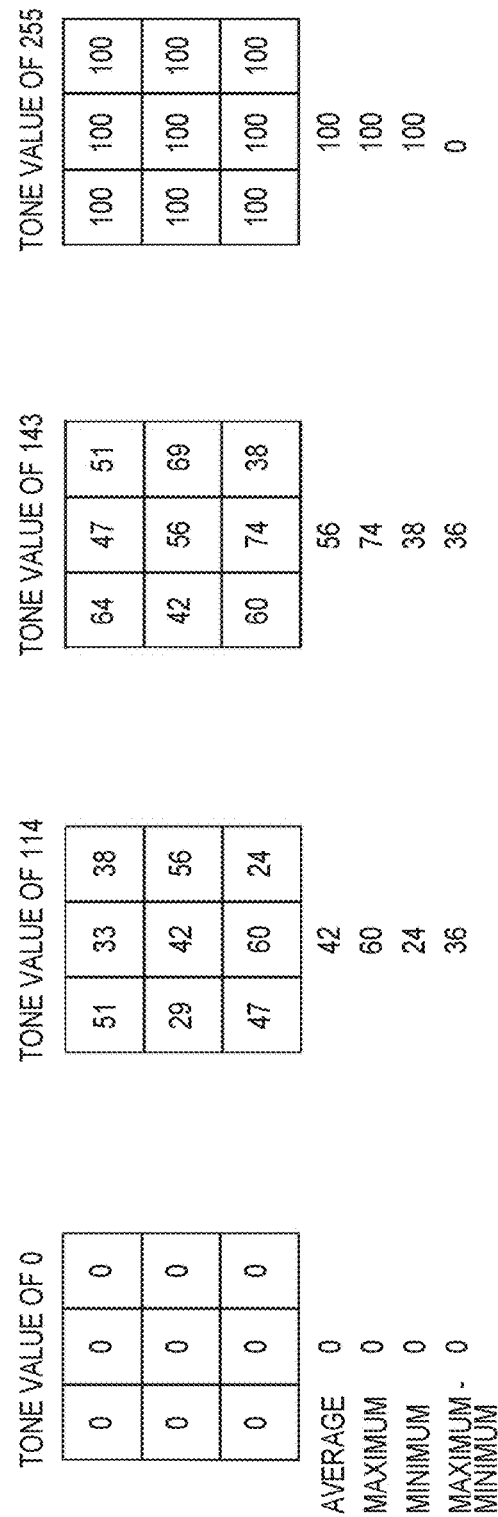
FIG. 13B shows views of the exposure area ratios of submatrices in some tone values according to an embodiment.

FIG. 13A shows an exposure portion of each submatrix in tone values of 0, 114, 143, and 255 as in FIG. 8A. FIG. 13B shows an exposure area ratio of each submatrix in the tone values of 0, 114, 143, and 255 as in FIG. 8B. As a matter of course, in this embodiment, halftone processing is performed by tables different from those in FIGS. 6A-1 to 6A-3, 6B-1 to 6B-3 and 6C-1 to 6C-3. Also in this embodiment, however, if tone values of all pixels in a dither matrix are the same, the exposure area ratios of the respective submatrices in the dither matrix are made different. In this embodiment, the average values of the exposure area ratios of the tone values of 114 and 143 are, respectively, 42% and 56% as in the first embodiment. However, a difference between the maximum value and the minimum value of the exposure area ratio of each of the tone values of 114 and 143 is 36% which is higher than 10% in the first embodiment.

Figure 14:
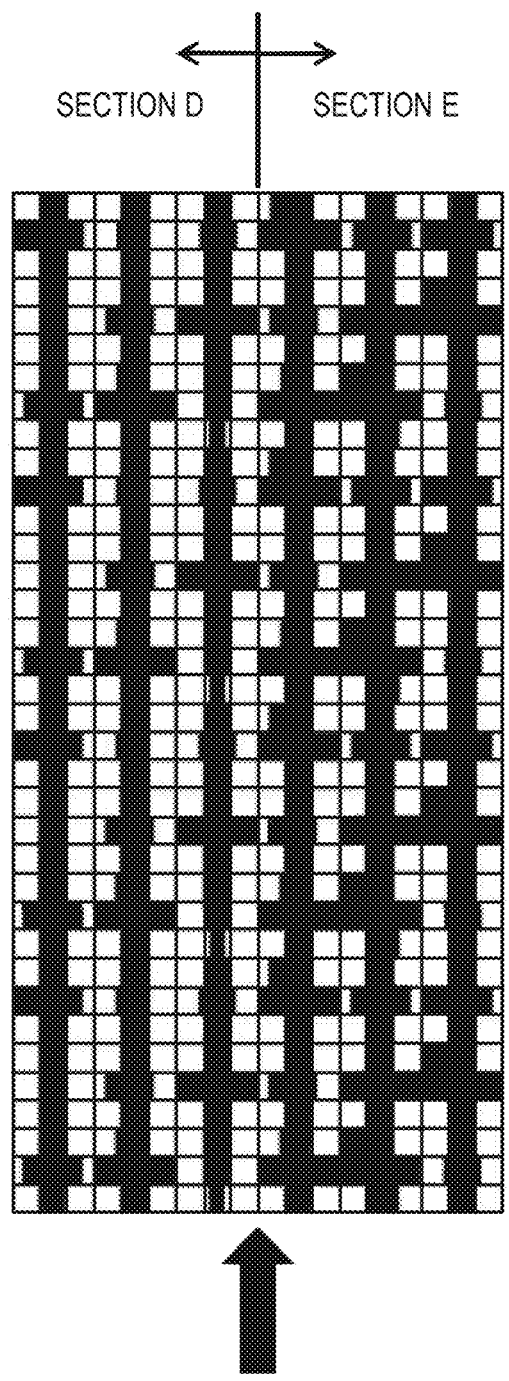
FIG. 14 is a view showing an exposure pattern in a section boundary according to an embodiment.

FIG. 14 is a view corresponding to FIG. 10 of the first embodiment. As in the first embodiment, the average value of exposure area ratios of a dither matrix in a section D is 42%, and the average value of the exposure area ratios of a dither matrix in a section E is 56%. Accordingly, this difference in exposure area ratio is canceled by a difference in exposure amount per unit area along with a variation in scan speed owing to an image height, making a difference between an average density in the entire section D and an average density in the entire section E smaller.

As shown in FIG. 13B, the maximum value of the exposure area ratios of the submatrices in the section D is 60%, and the minimum value of the exposure area ratios of the submatrices in the section E is 38%. That is, in this embodiment, in addition to making the average value of the exposure area ratios in the section E larger than in the section D, the minimum value of the exposure area ratios in the section E is made equal to or smaller than the maximum value of the exposure area ratios in the section D. More generally speaking, first, out of two dither matrices adjacent in a section X and a section Y different from each other, let α be a dither matrix in the section X close to an on-axis image height, and let β be a dither matrix in the section Y close to the most off-axis image height. Then, a density correction processing unit 101z converts the first tone value into the second tone value larger than 0 in the section X, and converts the first tone value into the third tone value which is larger than the second tone value and equal to or smaller than 255 in the section Y. Note that the first tone value is a tone value in a range equal to or larger than a tone value A and equal to or smaller than a tone value B. Let Sα be an average value, and let Sαmax be a maximum value of the exposure area ratios of the dither matrix α in which all pixels have the second tone values. Let Sβ be an average value, and let Sβmin be a minimum value of the exposure area ratios of the dither matrix β in which all pixels have the third tone values. In this embodiment, halftone processing is performed so as to hold relations given by:

$S\alpha < S\beta$ $S\alpha max \geq S\beta min$

Note that the tone value A and the tone value B are, for example, 1 and 254. It is also possible, however, that the tone value A is a value larger than 1, and the tone value B is a value smaller than 254. This is because it is difficult to visually recognize a density step in a high density region or a low density region.

Thus, in addition to causing a density change in each submatrix of the dither matrices in the section D and the section E, the ranges of changes in exposure area ratio of the both sections are overlapped. Consequently, a boundary portion seems more mixed, making it difficult to visually recognize the portion.

Third Embodiment

The third embodiment will now be described mainly concerning the difference from the first embodiment. In this embodiment, an image processing unit 101 decides a development region of each submatrix in a dither matrix based on a tone value after correction by a density correction processing unit 101z. Note that the size of the development region increases as the tone value after correction by the density correction processing unit 101z increases. Then, a PWM control unit 101c generates a PWM signal such that toner is attached to the decided development region. This makes it possible to cause a slight density variation more appropriately at the level of a toner image. The relationship between an exposure area and a development area changes by the installation environment of an image forming apparatus or the accumulated number of printed sheets. By deciding the development region, however, it is possible to further suppress a vertical stripe-like image failure in a section boundary portion in consideration of this relationship.

Figure 15A:
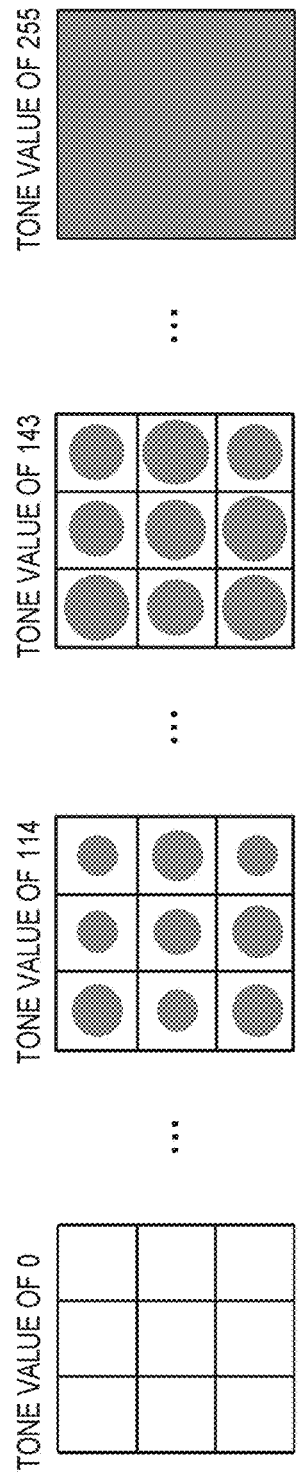
FIG. 15A shows views of the relationships between tone values and development regions according to an embodiment.

FIG. 15A shows views of the relationships between tone values and development regions when 81 pixels in a dither matrix all have the same tone value, and shows a representative case in which the tone values are 0, 114, 143, and 255. Note that shaded portions in FIG. 15A correspond to the development regions. In the tone value of 0 (solid white image), all submatrices are not developed. In the tone value of 114 and the tone value of 143, a predetermined region in each submatrix is developed. In the tone value of 255 (solid black image), all the regions are developed.

Figure 15B:
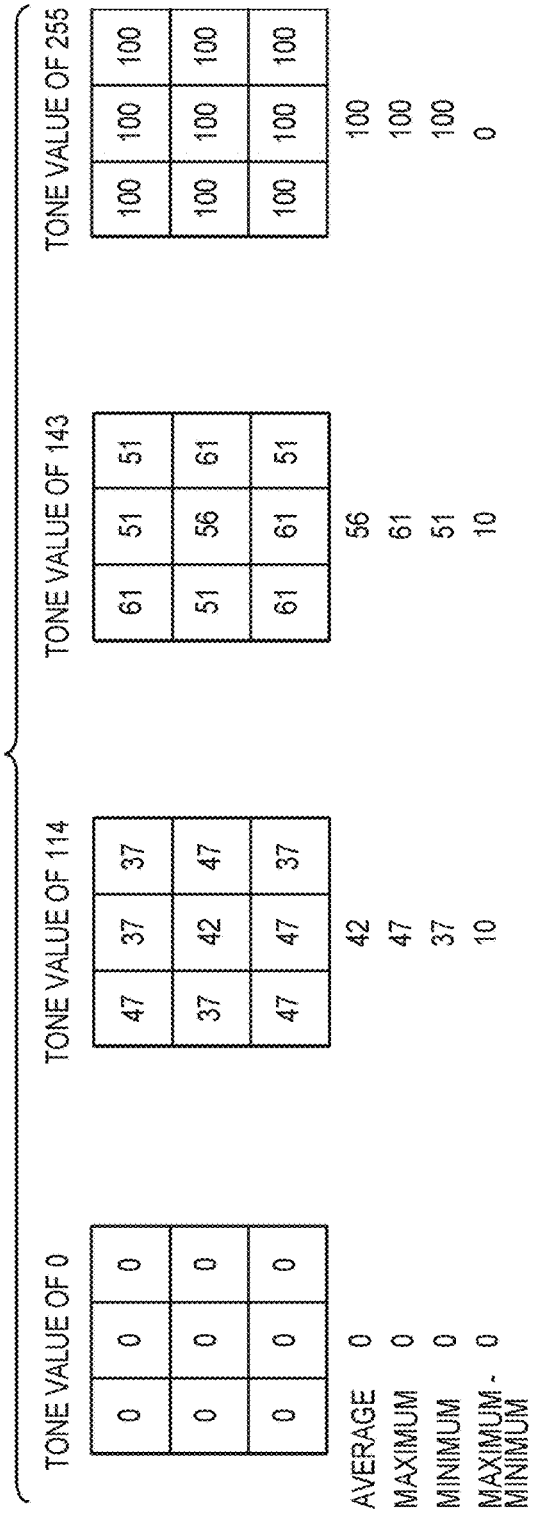
FIG. 15B shows views of the development area ratios of submatrices in some tone values according to an embodiment.

FIG. 15B shows the development area ratio of each submatrix in the tone values of 0, 114, 143, and 255. Note that the development area ratio of each submatrix refers to the ratio of the area of the development region to the area of an entire submatrix. As shown in FIG. 15B, in the tone value of 114, the development area ratio of a submatrix #5 is 42%, the development area ratios of submatrices #1, #6, #7, and #8 are 47%, and the development area ratios of submatrices #2, #3, #4, and #9 are 37%. Thus, in the tone value of 114, the development area ratios have the average value of 42%, the maximum value of 47%, the minimum value of 37%, and the maximum value–the minimum value of 10%. In the tone value of 143, the development area ratio of the submatrix #5 is 56%, the development area ratios of the submatrices #1, #6, #7, and #8 are 61%, and the development area ratios of the submatrices #2, #3, #4, and #9 are 51%. Thus, in the tone value of 143, the development area ratios have the average value of 56%, the maximum value of 61%, the minimum value of 51%, and the maximum value–the minimum value of 10%.

Figure 16:
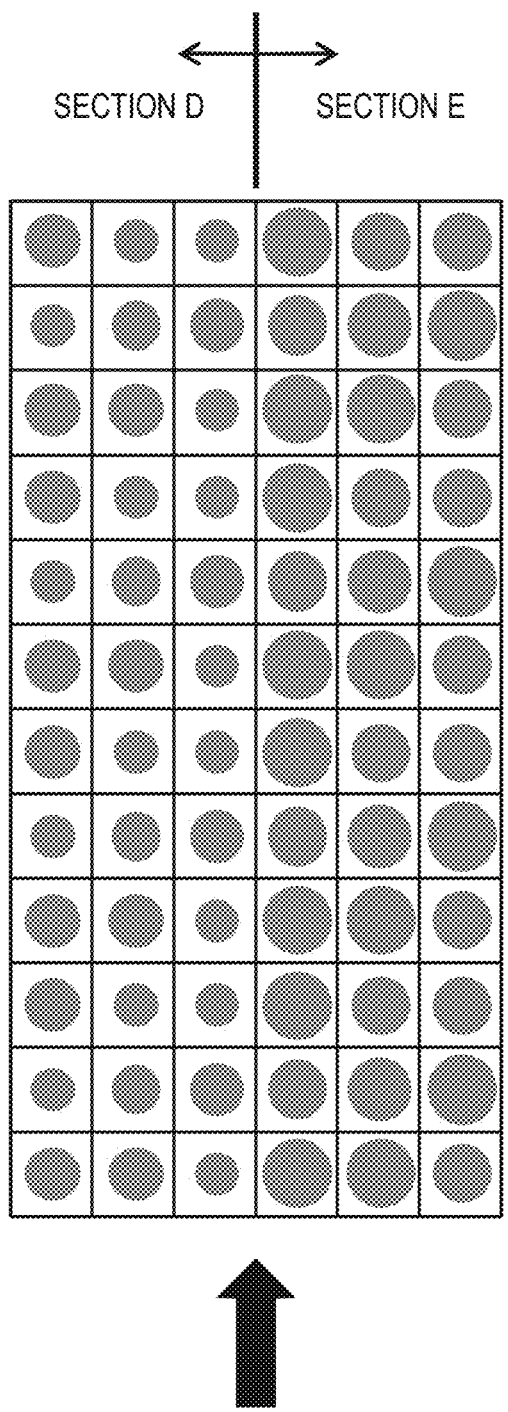
FIG. 16 is a view showing a development pattern in a section boundary according to an embodiment.

FIG. 16 is a view showing a development pattern of an image in which the tone values of all pixels are 114. Note that FIG. 16 shows a boundary between a section D and a section E. As shown in FIG. 9, tone values after density correction processing are 114 in the section D and 143 in the section E. Thus, as shown in FIG. 15B, the average values of the development area ratios of dither matrices in the section D and the section E are 42% and 56%, respectively. Therefore, by a change in exposure amount per unit length owing to an image height, an average density in the entire section D and an average density in the entire section E become almost the same. Note that a difference in exposure amount per unit length near the boundary portion is small. In this case, as described in the first embodiment, if the development area ratios of the respective submatrices in the dither matrix are the same, a stripe along a boundary may be recognized visually. As in the first embodiment, however, the development area ratios of the respective submatrices in the dither matrix are also different in this embodiment, suppressing vision of a vertical stripe caused by a density step in a section boundary portion.

Fourth Embodiment

The fourth embodiment will now be described mainly concerning the difference from the third embodiment. In this embodiment, a change in development area ratio of each submatrix in a dither matrix is made larger, suppressing occurrence of a stripe-like image failure in a sub-scanning direction more stably.

Figure 17A:
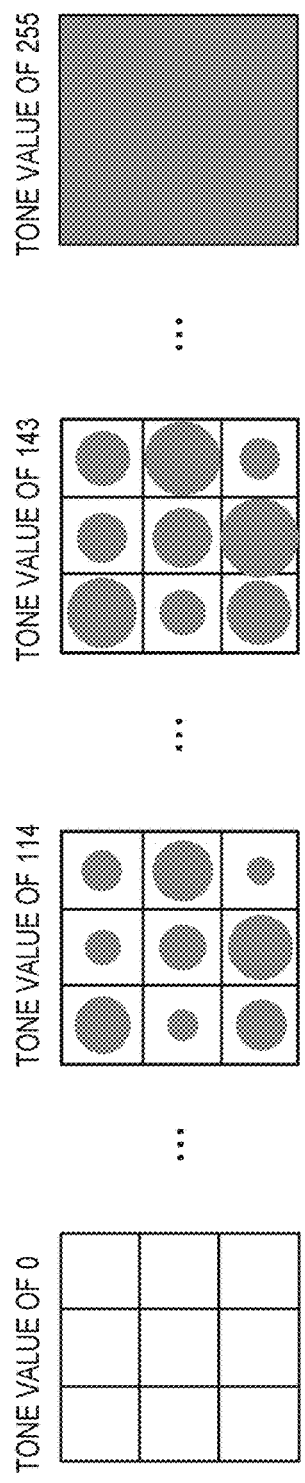
FIG. 17A shows views of the relationships between tone values and development regions according to an embodiment.
Figure 17B:
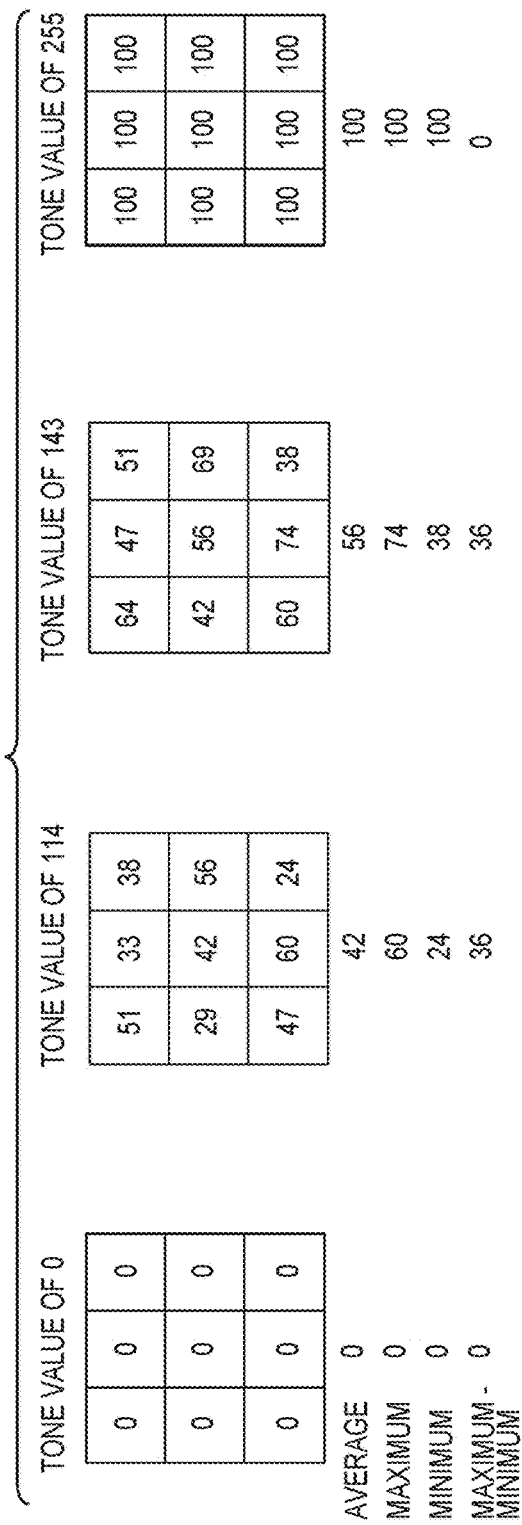
FIG. 17B shows views of the development area ratios of submatrices in some tone values according to an embodiment.

FIG. 17A shows a development region of each submatrix in tone values of 0, 114, 143, and 255 as in FIG. 15A. FIG. 17B shows the development area ratio of each submatrix in the tone values of 0, 114, 143, and 255 as in FIG. 15B. Note that the average values of the development area ratios in the tone values of 114 and 143 are, respectively, 42% and 56%, as in the third embodiment. However, differences between the maximum values and the minimum values of the development area ratios of the tone values of 114 and 143 are 36% which is larger than 10% in the third embodiment.

Figure 18:
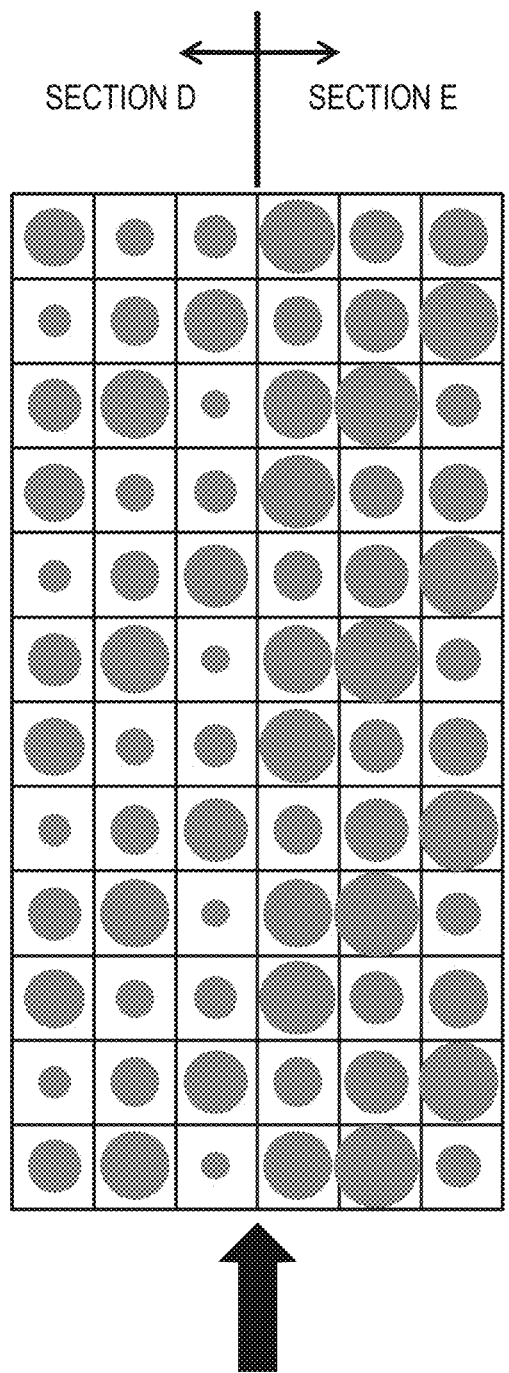
FIG. 18 is a view showing a development pattern in a section boundary according to an embodiment.

FIG. 18 is a view corresponding to FIG. 16 of the third embodiment. As in the third embodiment, the average value of the development area ratios of a dither matrix in a section D is 42%, and the average value of the development area ratios of a dither matrix in a section E is 56%. Accordingly, this difference in development area ratio is canceled by a difference in exposure amount by a variation in scan speed owing to an image height, making a difference between an average density in the entire section D and an average density in the entire section E smaller.

As shown in FIG. 17B, the maximum value of the development area ratios of the submatrices in the section D is 60%, and the minimum value of the development area ratios of the submatrices in the section E is 38%. Thus, in this embodiment, in addition to making the average value of the development area ratios in the section E larger than that in the section D, the minimum value of the development area ratios in the section E is made equal to or smaller than the maximum value of the development area ratios in the section D. More generally speaking, first, out of two dither matrices adjacent in a section X and a section Y different from each other, let α be a dither matrix in the section X close to an on-axis image height, and let β be a dither matrix in the section Y close to the most off-axis image height. Then, a density correction processing unit 101z converts the first tone value into the second tone value larger than 0 in the section X, and converts the first tone value into the third tone value which is larger than the second tone value and equal to or smaller than 255 in the section Y. Note that the first tone value is a tone value in a range equal to or larger than a tone value A and equal to or smaller than a tone value B. Let Tα be an average value, and let Tαmax be a maximum value of the development area ratios of the dither matrix α in which all pixels have the second tone values. Let Tβ be an average value, and let Tβmin be a minimum value of the development area ratios of the dither matrix β in which all pixels have the third tone values. In this embodiment, a development area is controlled so as to hold relations given by:

$$T\alpha < T\beta$$

$$T\alpha max \geq T\beta min$$

Note that the tone value A and the tone value B are, for example, 1 and 254. It is also possible, however, that the tone value A is a value larger than 1, and the tone value B is a value smaller than 254. This is because it is difficult to visually recognize a density step in a high density region or a low density region.

Thus, in addition to causing a density change in each submatrix of the dither matrices in the section D and the section E, the ranges of changes in development area ratio of the both sections are overlapped. Consequently, a boundary portion seems more mixed, making it difficult to visually recognize the portion.

Others

Each embodiment has been described above. However, the present invention is not limited to each embodiment described above. For example, in each embodiment described above, a dither matrix without any screen angle is used. It is possible, however, to use a dither matrix provided with a screen angle of, for example, 45°. In each embodiment described above, the emission luminance of the light source 401 is constant. However, an arrangement that adjusts the emission luminance of a light source in accordance with an image height may be adopted. Note that even in an arrangement that adjusts the emission luminance such that an exposure amount per unit length becomes constant regardless of the image height, a spot shape of a light beam may change in accordance with the image height, causing a density variation. Even in such an arrangement, it is possible to obtain the same effect by applying the present invention.

In the above-described embodiments, an arrangement that sets a difference in tone value after density correction between adjacent sections to 28 to 29 as shown in FIG. 9 has been adopted. However, the present invention is also applicable to an arrangement that sets a difference in tone value between adjacent sections to a smaller value, for example, 1 as the minimum unit of a tone value, making it possible to obtain the same effect. That is, when a tone value is corrected for each section divided in a main scanning direction, even a slight difference in tone value which is unnoticeable unless it increases in a sub-scanning direction becomes visible as a vertical stripe if it increases in the sub-scanning direction along a section boundary. In this case, it is also possible to suppress the vertical stripe by changing an exposure area ratio or a development area ratio for each submatrix of a dither matrix in one or both of two adjacent sections. It is thus possible to suppress the vertical stripe also in a case in which an optical scanning apparatus that changes a scan speed in the main scanning direction is used.

Figure 19:
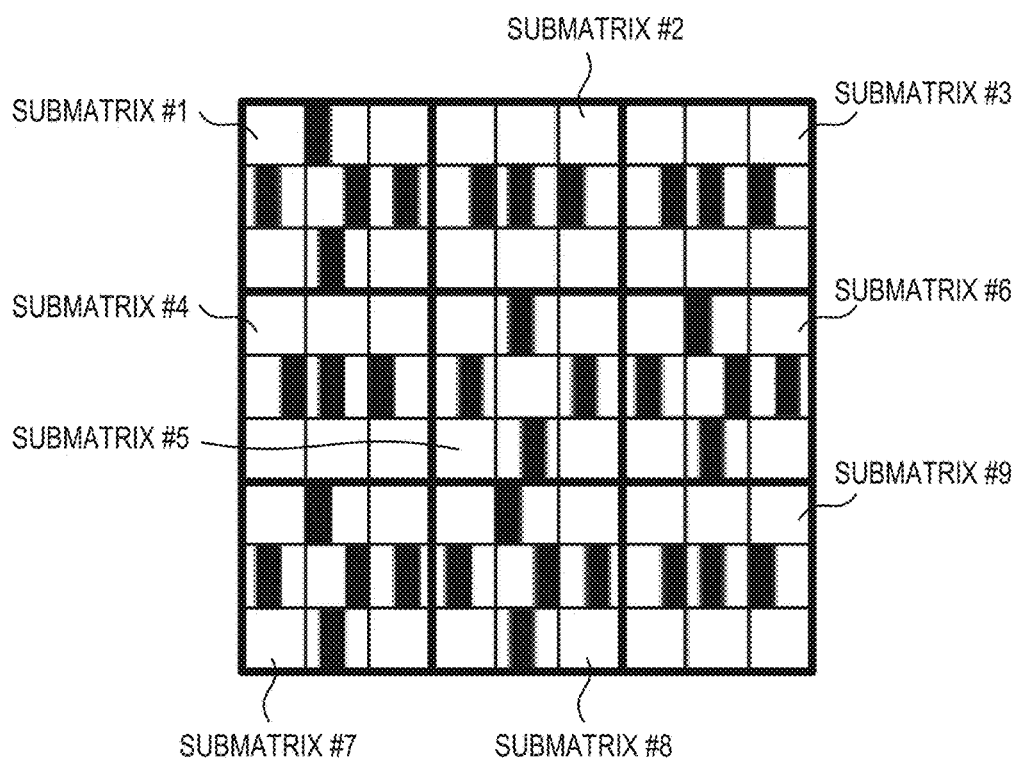
FIG. 19 is a view showing an exposure pattern of a dither matrix according to an embodiment.

In each embodiment described above, an arrangement in which the exposure regions are combined in the submatrices of the dither matrix, and a single dot image is formed in each submatrix has been adopted. However, the present invention is also applicable to an arrangement in which exposure regions in submatrices are not combined, and a plurality of dot images are formed in the submatrices. FIG. 19 shows an example in which a plurality of dot images are formed in submatrices in a case in which the tone values of all pixels in a dither matrix are the same. In FIG. 19, five dot images are formed in each of submatrices #1, #6, #7, and #8. Four dot images are formed in a submatrix #5. Furthermore, three dot images are formed in each of submatrices #2, #3, #4, and #9. With such an arrangement, it is also possible to change the exposure area ratio or the development area ratio for each submatrix and obtain the same effect.

Note that in each embodiment described above, the description has been given by taking the arrangement of the dither matrix with a submatrix structure as an example. However, the present invention is not limited to this. Without such a structure, it is also possible to obtain the same effect by adjusting the sizes, number, or both of them of dot images for each predetermined area or for each predetermined area formed by a plurality of pixels even though it is not the predetermined area and changing an exposure area ratio or a development area ratio.

Furthermore, in the above-described first embodiment, if the tone values of all the pixels in the dither matrix are the same, and are different from their maximum value (255) and the minimum value (0), the size of the exposure region of at least one submatrix in the dither matrix is different from others. As a more general arrangement, however, it is also possible to adopt an arrangement that makes the size of an exposure region of at least one submatrix of a dither matrix different from others when the tone values of all pixels of the dither matrix are the same, and falls within a predetermined range, that is, equal to or larger than a tone value A and equal to or smaller than a tone value B. Note that the tone value A is a value larger than 1, and the tone value B is a value smaller than 254. This is because it is difficult to visually recognize a density step in a high density region or a low density region.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-096542, filed on May 15, 2017, which is hereby incorporated by reference herein in its entirety.

What is claimed is:
1. An image forming apparatus comprising:
a photosensitive member;
an irradiation unit configured to form an electrostatic latent image on the photosensitive member by scanning a laser beam at a non-uniform scan speed with respect to a main scanning direction and exposing the photosensitive member;

a correction unit configured to generate second image data by performing correction processing for correcting a tone value of a pixel in first image data in accordance with a position in the main scanning direction; and a halftone processing unit configured to perform halftone processing on the second image data by a dither matrix that includes a plurality of submatrices each including a plurality of pixels and decide an exposure region of an image formed by the irradiation unit, wherein in at least one of a first dither matrix corresponding to a first section, and a second dither matrix corresponding to a second section adjacent to the first dither matrix in the main scanning direction and corresponding to the second section different from the first section in tone value, at least a size of an exposure region of an image formed by using a first submatrix corresponding to a predetermined tone value in the dither matrix and a size of an exposure region of an image formed by using a second submatrix corresponding to the predetermined tone value are different.

2. The apparatus according to claim 1, wherein the first submatrix and the second submatrix are adjacent to a boundary between the first dither matrix and the second dither matrix.

3. The apparatus according to claim 1, wherein at least one of a plurality of submatrices having the same position in a sub-scanning direction perpendicular to the main scanning direction is the first submatrix, and at least one of the plurality of submatrices is the second submatrix.

4. The apparatus according to claim 1, wherein in at least one of the first dither matrix and the second dither matrix, the size of the exposure region of the image formed by using the first submatrix corresponding to the predetermined tone value in the dither matrix and a size of an exposure region of an image formed by using a third submatrix corresponding to the predetermined tone value are different, and the third submatrix is scanned in the same line as the first submatrix in the main scanning direction.

5. The apparatus according to claim 1, wherein an average exposure region obtained by averaging respective exposure regions of images formed by using the plurality of submatrices is an exposure region corresponding to a tone value of a dither matrix including the plurality of submatrices.

6. The apparatus according to claim 1, wherein the correction unit is further configured to, in the correction processing, generate the second image data by correcting the first image data for each of a plurality of sections along the main scanning direction, convert a first tone value in the first section into a second tone value larger than a minimum value that can be taken by a tone value, and convert the first tone value in the second section into a third tone value smaller than a maximum value that can be taken by a tone value.

7. The apparatus according to claim 6, wherein in the halftone processing, a minimum value in a size of an exposure region of an image formed by using a plurality of submatrices in the second dither matrix when the second dither matrix has the third tone value is not more than a maximum value in a size of an exposure region of an image formed by using a plurality of submatrices in the first dither matrix when the first dither matrix has the second tone value.

8. The apparatus according to claim 1, wherein in the halftone processing, first information indicating a relationship between a threshold and a tone value used in the first submatrix, and second information indicating a relationship between a threshold and a tone value used in the second submatrix are different.

9. An image forming apparatus comprising:

a photosensitive member;

an irradiation unit configured to form an electrostatic latent image on the photosensitive member by scanning a laser beam at a non-uniform scan speed with respect to a main scanning direction and exposing the photosensitive member;

a correction unit configured to generate second image data by performing correction processing for correcting a tone value of a pixel in first image data in accordance with a position in the main scanning direction; and a decision unit configured to decide, based on the second image data, a development region of an image formed by using each submatrix of a dither matrix including a plurality of submatrices, wherein in at least one of a first dither matrix corresponding to a first section, and a second dither matrix corresponding to the second section adjacent to the first dither matrix in the main scanning direction and corresponding to the second section different from the first section in tone value, at least a size of a development region of an image formed by using a first submatrix corresponding to a predetermined tone value in the dither matrix and a size of a development region of an image formed by using a second submatrix corresponding to the predetermined tone value are different.

10. The apparatus according to claim 9, wherein the first submatrix and the second submatrix are adjacent to a boundary between the first dither matrix and the second dither matrix.

11. The apparatus according to claim 9, wherein at least one of a plurality of submatrices having the same position in a sub-scanning direction perpendicular to the main scanning direction is the first submatrix, and at least one of the plurality of submatrices is the second submatrix.

12. The apparatus according to claim 9, wherein in at least one of the first dither matrix and the second dither matrix, the size of the development region of the image formed by using the first submatrix corresponding to the predetermined tone value in the dither matrix and a size of a development region of an image formed by using a third submatrix corresponding to the predetermined tone value are different, and the third submatrix is scanned in the same line as the first submatrix in the main scanning direction.

13. The apparatus according to claim 9, wherein an average development region obtained by averaging respective development regions of images formed by using the plurality of submatrices is a development region corresponding to a tone value of a dither matrix including the plurality of submatrices.

14. The apparatus according to claim 9, wherein the correction unit is further configured to, in the correction processing, generate the second image data by correcting the first image data for each of a plurality of sections along the main scanning direction, convert a first tone value in the first section into a second tone value larger than a minimum value that can be taken by a tone value, and convert the first tone value in the second section into a third tone value smaller than a maximum value that can be taken by a tone value.

15. The apparatus according to claim 14, wherein a minimum value in a size of a development region of an image formed by using a plurality of submatrices in the second dither matrix when the second dither matrix has the third tone value is not more than a maximum value in a size of a development region of an image formed by using a plurality of submatrices in the first dither matrix when the first dither matrix has the second tone value.

16. The apparatus according to claim 9, wherein first information indicating a relationship between a threshold and a tone value used in the first submatrix, and second information indicating a relationship between a threshold and a tone value used in the second submatrix are different.

17. The apparatus according to claim 1, wherein the plurality of submatrices in the first dither matrix and the second dither matrix are equal in size.

18. The apparatus according to claim 1, wherein the first submatrix and the second submatrix increase such that exposure regions are different in accordance with an increase in tone value.

19. The apparatus according to claim 1, wherein the first submatrix and the second submatrix increase such that increase directions of exposure regions are different in accordance with an increase in tone value.

20. The apparatus according to claim 1, wherein with respect to an image clock for forming a latent image by irradiating the photosensitive member with light by the irradiation unit, a frequency of the image clock is corrected in accordance with a position in the main scanning direction.

21. The apparatus according to claim 1, wherein the first dither matrix and the second dither matrix are dither matrices each provided with a screen angle.

22. An image forming apparatus comprising:
a photosensitive member;
an irradiation unit configured to form an electrostatic latent image on the photosensitive member by scanning a laser beam at a non-uniform scan speed with respect to a main scanning direction and exposing the photosensitive member; and
a correction unit configured to correct a tone value of a pixel in image data in accordance with a position in the main scanning direction,
wherein in a plurality of regions in at least one of a first section, and a second section adjacent to the first section in the main scanning direction and different from the first section in tone value, at least a size of an exposure region in a first region corresponding to a predetermined tone value and a size of an exposure region in a second region corresponding to the predetermined tone value are different.

23. An image forming apparatus comprising:
a photosensitive member;
an irradiation unit configured to form an electrostatic latent image on the photosensitive member by scanning a laser beam at a non-uniform scan speed with respect to a main scanning direction and exposing the photosensitive member; and
a correction unit configured to correct a tone value of a pixel in image data in accordance with a position in the main scanning direction,
wherein in a plurality of regions in at least one of a first section, and a second section adjacent to the first section in the main scanning direction and different from the first section in tone value, at least a size of a development region in a first region corresponding to a predetermined tone value and a size of a development region in a second region corresponding to the predetermined tone value are different.

24. The apparatus according to claim 1, wherein the first section is scanned at a first scan speed, and the second section is scanned at a second scan speed faster than the first scan speed, and
the correction unit is further configured to perform the correction processing such that the tone value of the pixel corresponding to the second section is larger than the tone value of the pixel corresponding to the first section.

25. The apparatus according to claim 1, wherein, in the second image data, a corrected first tone value that is the predetermined tone value corresponding to the first submatrix and a corrected second tone value that is the predetermined tone value corresponding to the second submatrix are same tone values, and
in the first image data before correcting by the correction unit, the first tone value before correction corresponding to the first submatrix and the second tone value before correction corresponding to the second submatrix are same tone values.

26. The apparatus according to claim 9, wherein the first section is scanned at a first scan speed, and the second section is scanned at a second scan speed faster than the first scan speed, and
the correction unit is further configured to perform the correction processing such that the tone value of the pixel corresponding to the second section is larger than the tone value of the pixel corresponding to the first section.

27. The apparatus according to claim 9, wherein, in the second image data, a corrected first tone value that is the predetermined tone value corresponding to the first submatrix and a corrected second tone value that is the predetermined tone value corresponding to the second submatrix are same tone values, and
in the first image data before correcting by the correction unit, the first tone value before correction corresponding to the first submatrix and the second tone value before correction corresponding to the second submatrix are same tone values.

28. The apparatus according to claim 22, wherein the first section is scanned at a first scan speed, and the second section is scanned at a second scan speed faster than the first scan speed, and
the correction unit is further configured to perform the correction processing such that the tone value of the pixel corresponding to the second section is larger than the tone value of the pixel corresponding to the first section.

29. The apparatus according to claim 22, wherein, in image data after correcting by the correction unit, a corrected first tone value that is the predetermined tone value corresponding to the first region and a corrected second tone value that is the predetermined tone value corresponding to the second region are same tone values, and
in the image data before correcting by the correction unit, the first tone value before correction corresponding to the first region and the second tone value before correction corresponding to the second region are same tone values.

30. The apparatus according to claim 23, wherein the first section is scanned at a first scan speed, and the second section is scanned at a second scan speed faster than the first scan speed, and
the correction unit is further configured to perform the correction processing such that the tone value of the pixel corresponding to the second section is larger than the tone value of the pixel corresponding to the first section.

31. The apparatus according to claim 23, wherein, in image data after correcting by the correction unit, a corrected first tone value that is the predetermined tone value corresponding to the first region and a corrected second tone value that is the predetermined tone value corresponding to the second region are same tone values, and in the image data before correcting by the correction unit, the first tone value before correction corresponding to the first region and the second tone value before correction corresponding to the second region are same tone values.

* * * * *